United States Patent
Batra et al.

(10) Patent No.: US 7,756,002 B2
(45) Date of Patent: Jul. 13, 2010

(54) TIME-FREQUENCY INTERLEAVED ORTHOGONAL FREQUENCY DIVISION MULTIPLEXING ULTRA WIDE BAND PHYSICAL LAYER

(75) Inventors: Anuj Batra, Dallas, TX (US); Jaiganesh Balakrishnan, Dallas, TX (US); Anand G. Dabak, Plano, TX (US); Ranjit Gharpurey, Ann Arbor, MI (US); Paul H. Fontaine, Richardson, TX (US); Heng-Chih Lin, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 939 days.

(21) Appl. No.: 10/688,169

(22) Filed: Oct. 18, 2003

(65) Prior Publication Data

US 2004/0151109 A1 Aug. 5, 2004

Related U.S. Application Data

(60) Provisional application No. 60/444,040, filed on Jan. 30, 2003, provisional application No. 60/451,902, filed on Mar. 4, 2003, provisional application No. 60/453,845, filed on Mar. 11, 2003.

(51) Int. Cl.
*H04J 11/00* (2006.01)
(52) U.S. Cl. .................. 370/208; 370/329; 370/343
(58) Field of Classification Search ............. 370/208, 370/210, 310, 343, 330, 338, 238, 329
See application file for complete search history.

(56) References Cited

U.S. PATENT DOCUMENTS

| | | | | |
|---|---|---|---|---|
| 6,449,246 | B1 * | 9/2002 | Barton et al. | 370/210 |
| 7,031,371 | B1 * | 4/2006 | Lakkis | 375/146 |
| 7,170,849 | B1 * | 1/2007 | Arivoli et al. | 370/208 |
| 7,206,350 | B2 * | 4/2007 | Korobkov et al. | 375/260 |
| 7,209,455 | B2 * | 4/2007 | Yee et al. | 370/310.1 |
| 2001/0028637 | A1 * | 10/2001 | Abeta et al. | 370/335 |
| 2002/0085641 | A1 * | 7/2002 | Baum | 375/260 |
| 2002/0119781 | A1 * | 8/2002 | Li et al. | 455/450 |
| 2003/0026360 | A1 * | 2/2003 | Ramasubramanian et al. | 375/343 |
| 2004/0005016 | A1 * | 1/2004 | Tewfik et al. | 375/302 |
| 2004/0008617 | A1 * | 1/2004 | Dabak et al. | 370/208 |
| 2004/0032825 | A1 * | 2/2004 | Halford et al. | 370/208 |
| 2004/0047285 | A1 * | 3/2004 | Foerster et al. | 370/210 |
| 2004/0208253 | A1 * | 10/2004 | Joo | 375/260 |
| 2005/0220002 | A1 * | 10/2005 | Li et al. | 370/208 |

* cited by examiner

*Primary Examiner*—Ricky Ngo
*Assistant Examiner*—Gary Mui
(74) *Attorney, Agent, or Firm*—Ronald O. Neerings; Wade James Brady, III; Frederick J. Telecky, Jr.

(57) ABSTRACT

A PHY entity for a UWB system utilizes the unlicensed 3.1-10.6 GHZ UWB band, as regulated in the United States by the Code of Federal Regulation, Title 47, Section 15. The UWB system provides a wireless pico area network (PAN) with data payload communication capabilities of 55, 80, 110, 160, 200, 320 and 480 Mb/s. The UWB system employs orthogonal frequency division multiplexing (OFDM) and uses a total of 122 sub-carriers that are modulated using quadrature phase shift keying (QPSK). Forward error correction coding (convolutional coding) is used with a coding rate of 11/32, 1/2, 5/8 and 3/4.

34 Claims, 20 Drawing Sheets

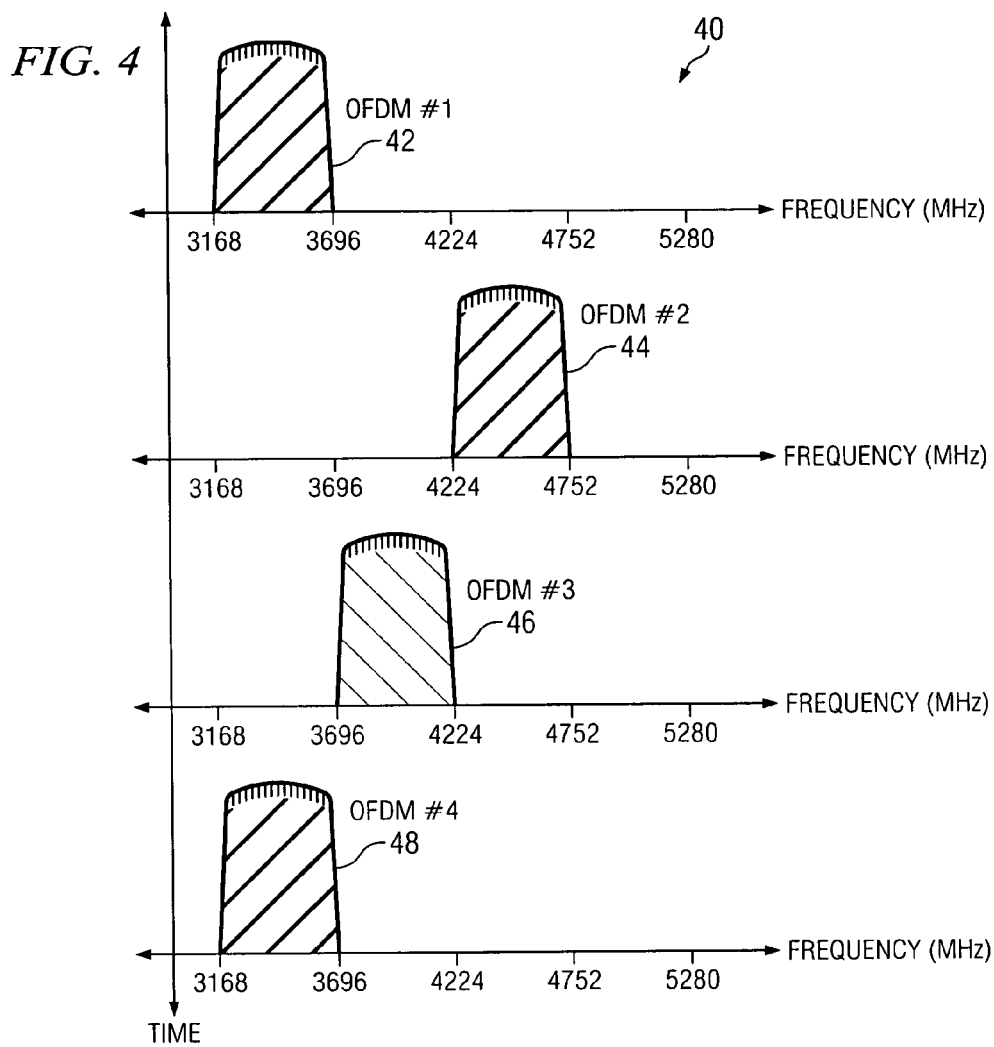
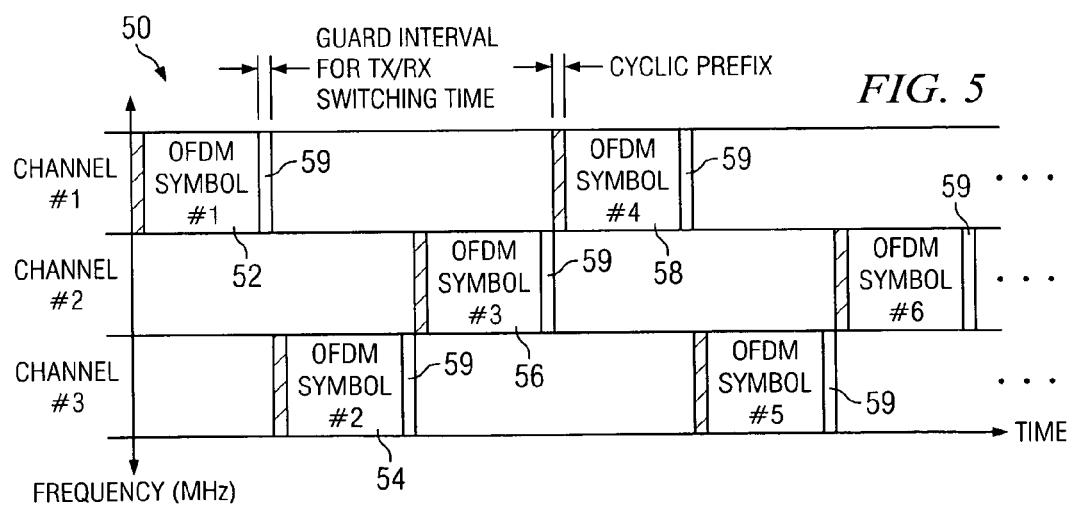

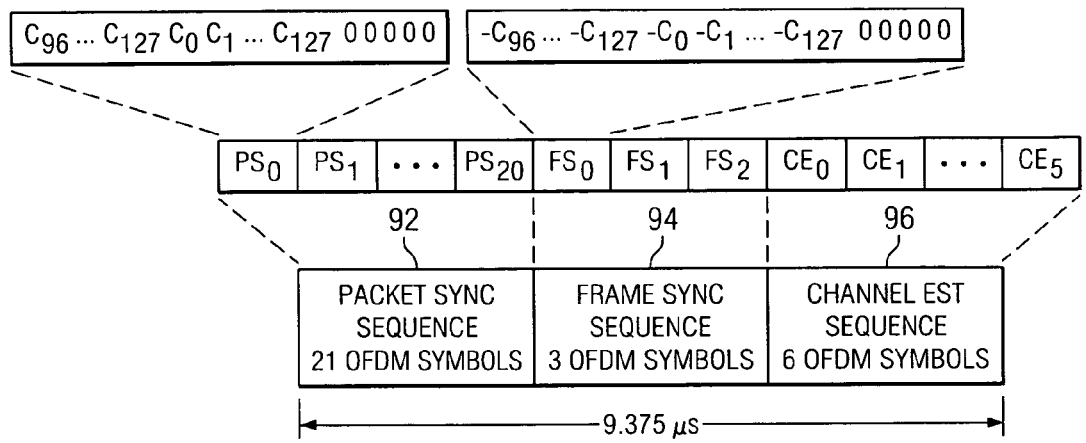
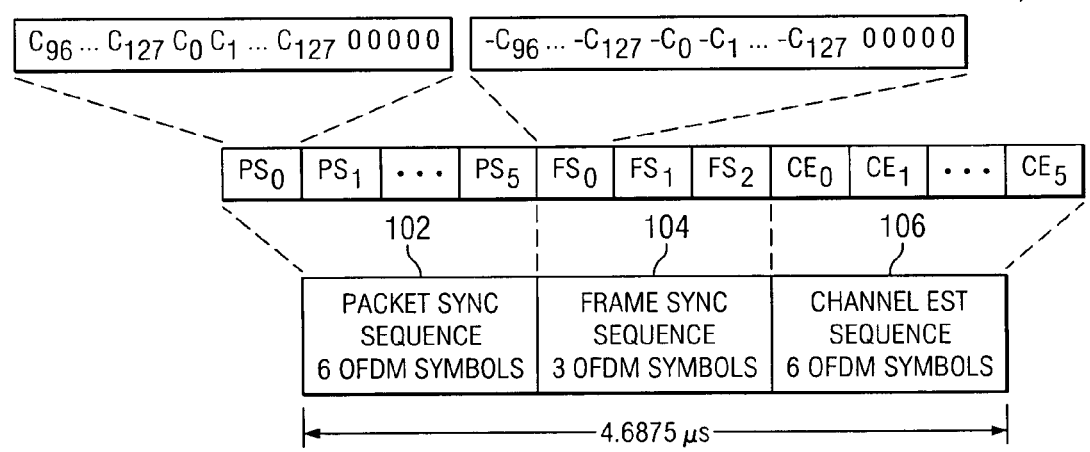
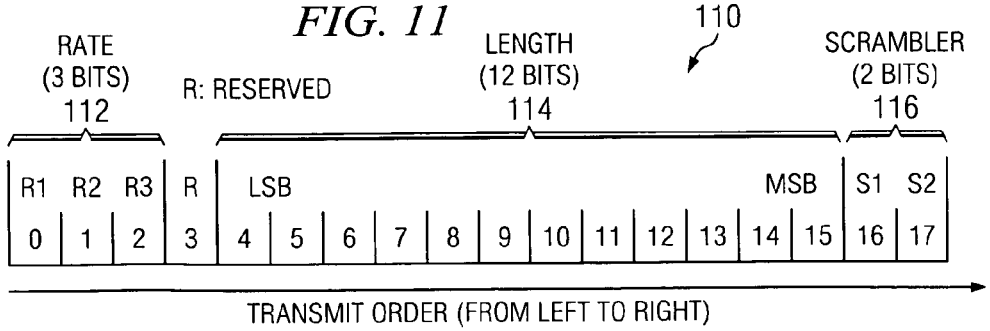
TRANSMIT ORDER (FROM LEFT TO RIGHT)

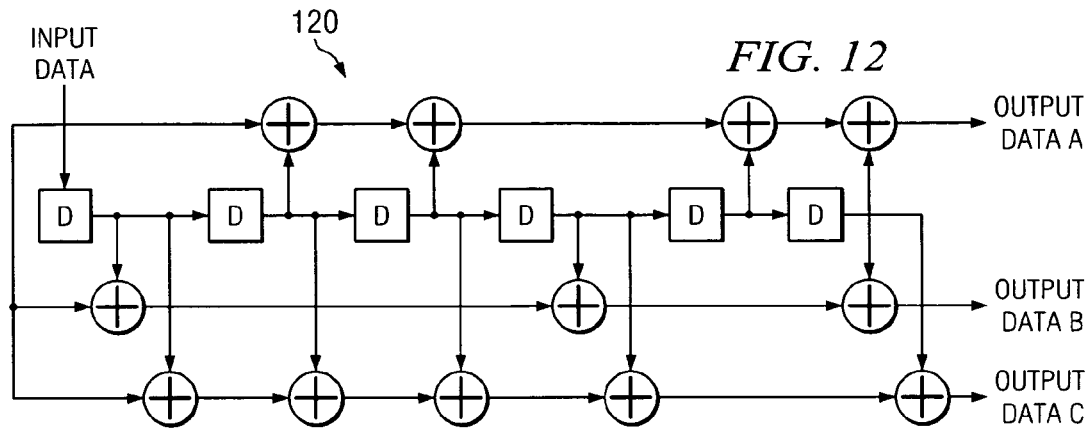
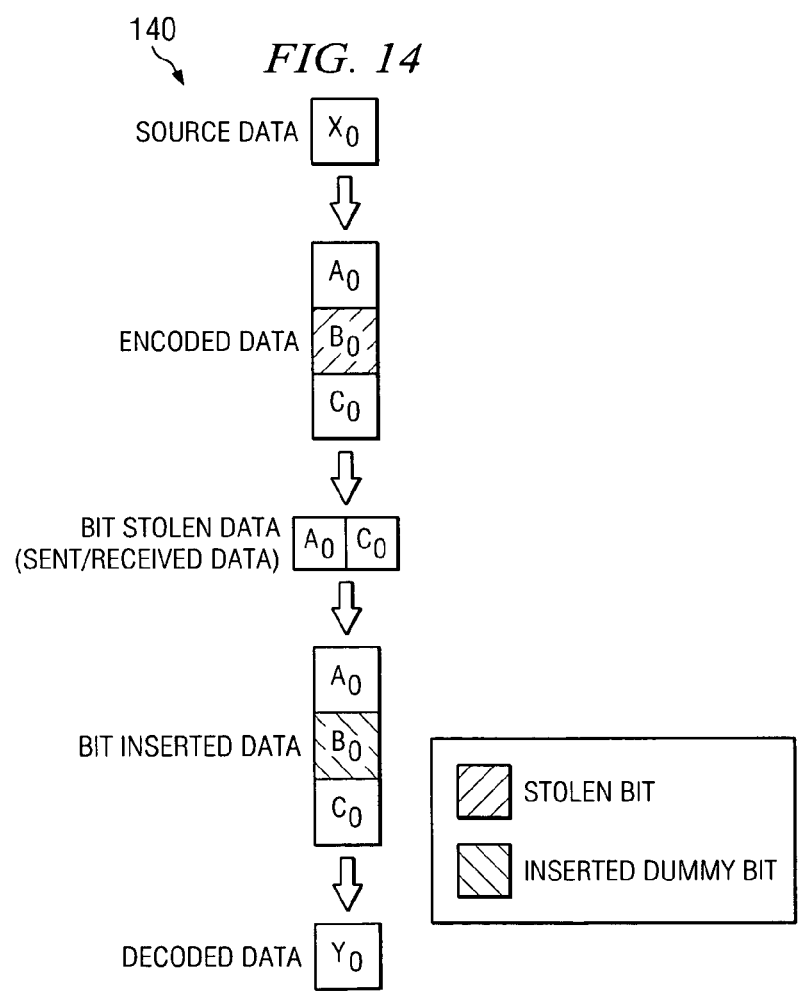

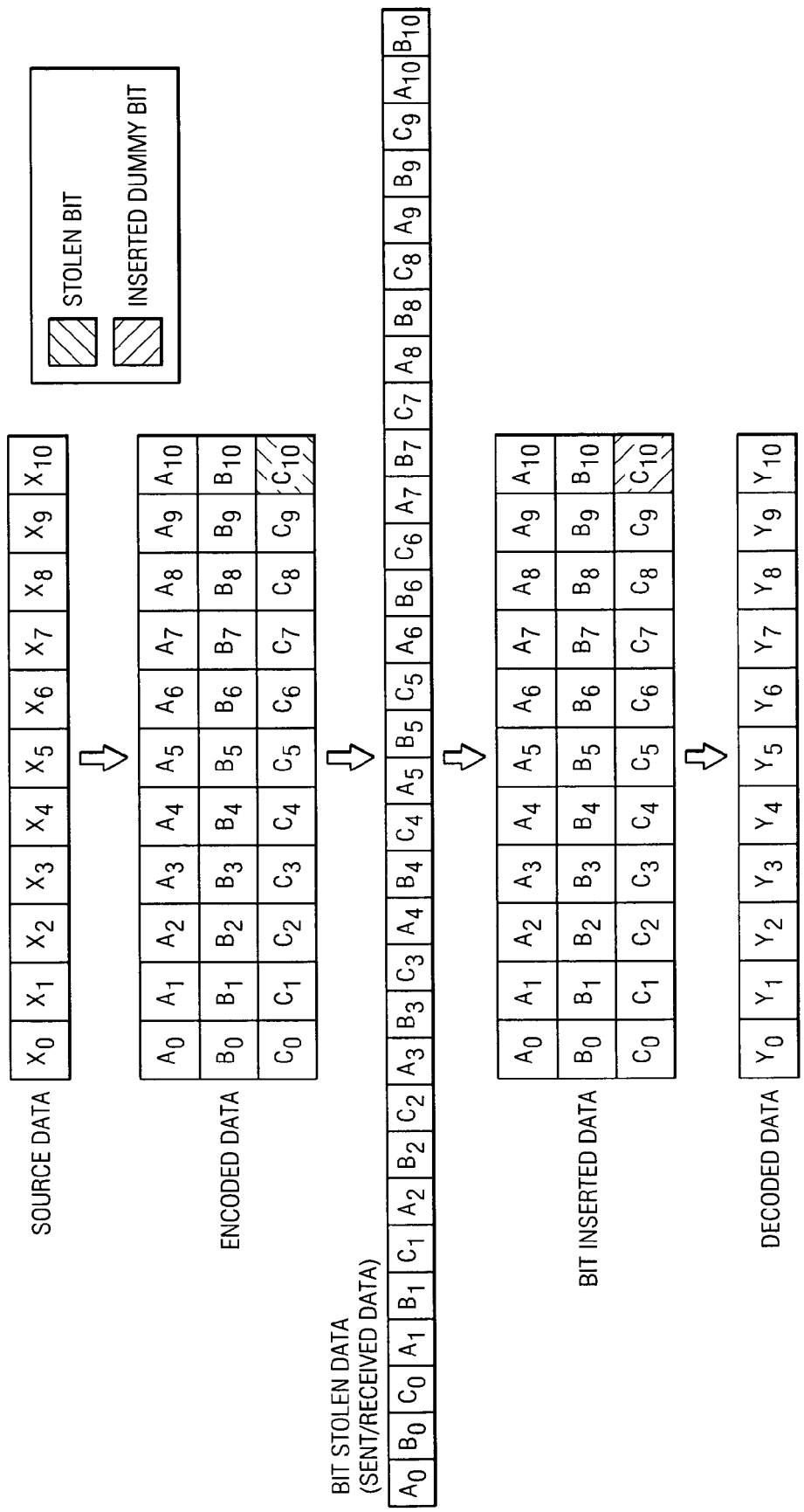

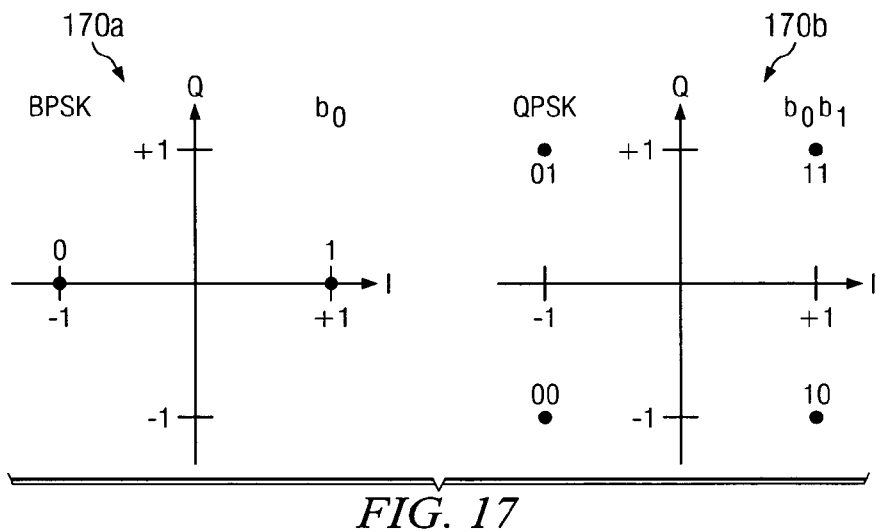
FIG. 17
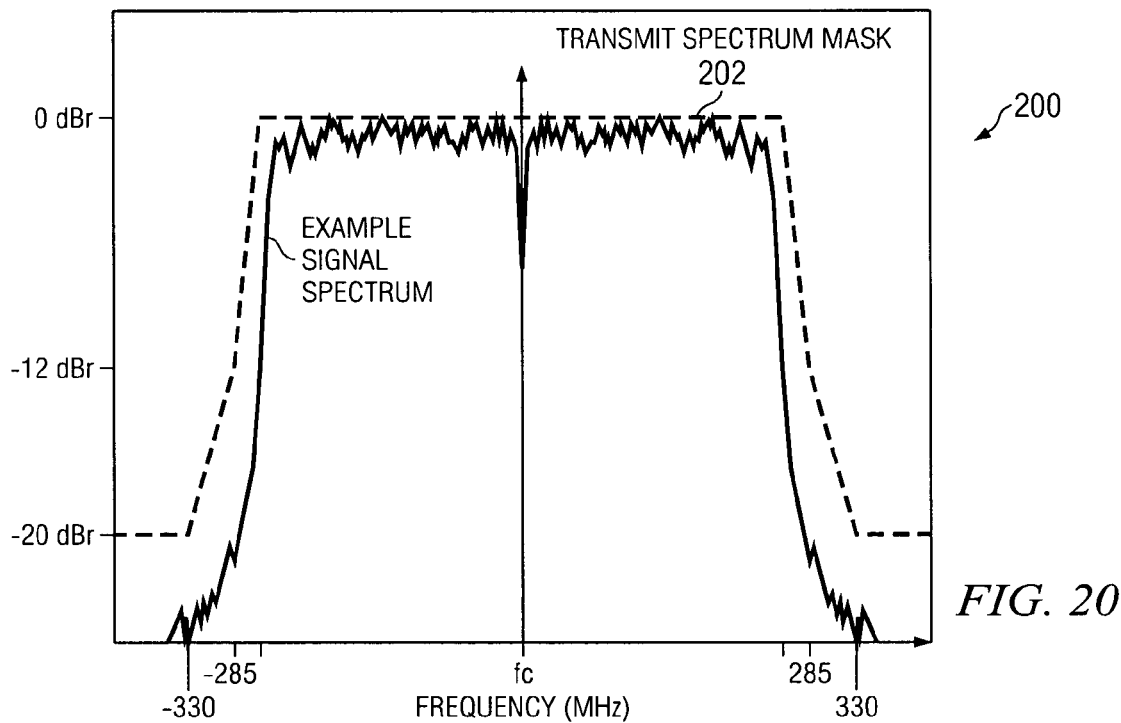
FIG. 20
IS_1 = {Channel_2, Channel_1, Channel_3, Channel_1, Channel_2, Channel_3, Repeats}
IS_2 = {Channel_1, Channel_3, Channel_2, Channel_3, Channel_2, Channel_1, Repeats}
FIG. 21
RS_1 = {IS_1, IS_3, IS_2, IS_1, IS_2, IS_3, Repeats}
RS_2 = {IS_2, IS_3, IS_1, IS_3, IS_2, IS_1, Repeats}
FIG. 22

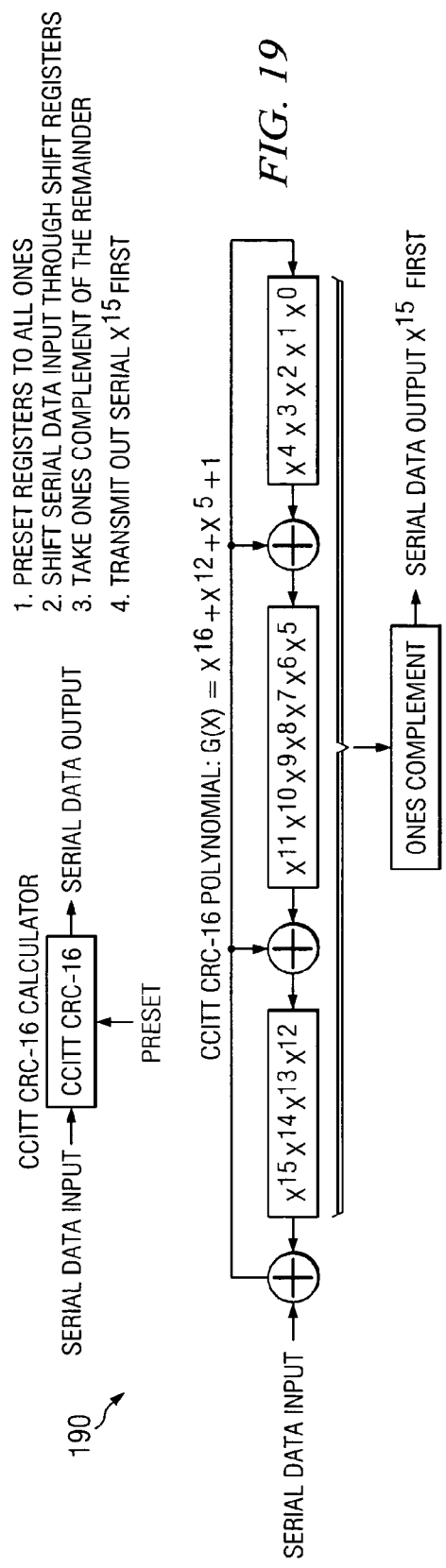
FIG. 19
FIG. 18
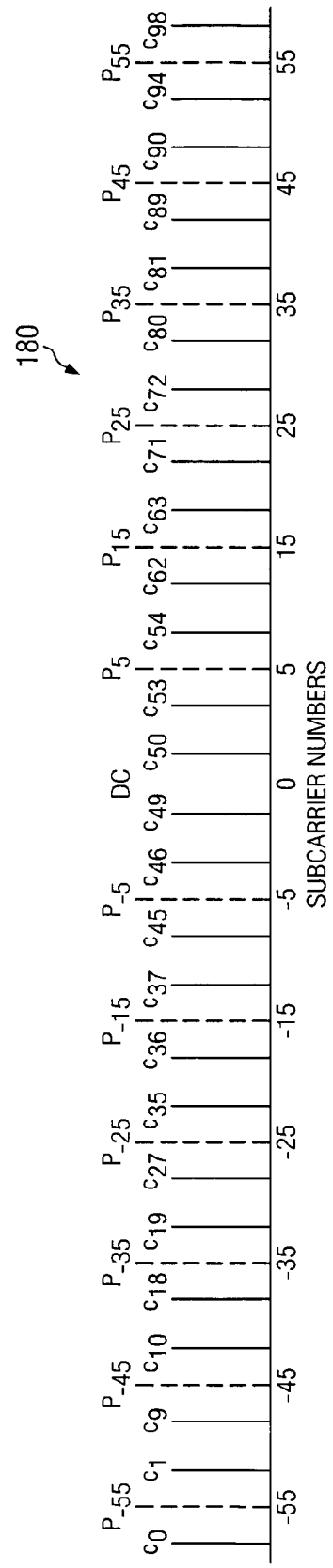

TIME-FREQUENCY INTERLEAVED ORTHOGONAL FREQUENCY DIVISION MULTIPLEXING ULTRA WIDE BAND PHYSICAL LAYER

RELATED PATENT APPLICATIONS

This application is related to and claims the benefit, under 35 U.S.C. §119(e)(1), of U.S. Provisional Application No. 60/444,040, entitled Time-Frequency Interleaved OFDM for Ultra-Wideband Systems, filed on Jan. 30, 2003 by Anuj Batra, Jaiganesh Balakrishnan and Anand G. Dabak; U.S. Provisional Application No. 60/451,902, entitled Multi-Carrier OFDM For Ultra-Wideband Systems, filed on Mar. 4, 2003 by Anuj Batra, Jaiganesh Balakrishnan and Anand G. Dabak; and U.S. Provisional Application No. 60/453,845, entitled TI Physical Layer Proposal For IEEE 802.15 Task Group 3A, filed on Mar. 11, 2003 by Anuj Batra, Jaiganesh Balakrishnan, Anand G. Dabak, Ranjit Gharpurey, Paul H. Fontaine and Heng-Chih Lin.

BACKGROUND OF THE INVENTION

1. Field of the Invention

This invention relates generally to wireless data communications, and more specifically to a physical layer for an ultra wide band (UWB) system that utilizes the unlicensed 3.1 GHz-10.6 GHz UWB band, as regulated in the United States by the Code of Federal Regulations, Title 47, Section 15.

2. Description of the Prior Art

An important parameter in the design of a UWB system is choice of the operating bandwidth. This choice impacts not only the link budget and correspondingly the overall system performance, but also affects the receiver, especially in terms of the LNA and mixer design, and the speed at which the digital-to-analog converters (DACs), the analog-to-digital converters (ADCs), and ultimately the baseband signal processing operate.

The overall system performance is related to the received power, which is a function of the difference between the total transmit power and the path loss. Since the FCC defines average power in terms of dBm per MHz, the total transmit power can be expressed completely in terms of the operating bandwidth. If the lower frequency $f_L$ of the operating bandwidth is fixed at 3.1 GHz and upper frequency $f_U$ is varied between 4.8 GHz and 10.6 GHz, then the total transmit power $P_{TX}(f_U)$ can be expressed as follows:

$$P_{TX}(f_U) = -41.25 + 10 \log_{10}(f_U - f_L)(\text{dBm})$$

This equation assumes that the transmit power spectral density is flat over the entire bandwidth. The path loss, which attenuates the transmitted signal, is also a function of the lower and upper frequencies of the operating bandwidth. The path loss model specified by the IEEE 802.15.3a channel modeling committee is given as follows:

$$P_L(f_g, d) = 20 \log_{10}\left[\frac{4\pi f_g d}{c}\right],$$

where $f_g$ is defined as the geometric average of the lower and upper frequencies, d is the distance measured in meters, and c is the speed of light.

The effects of increasing the upper frequency past 4.8 GHz are described herein below. In FIG. 1, the received power 10 at a distance of 10 meters as a function of the upper frequency is plotted. From this figure, it can be seen that the received power increases by at most 2.0 dB (3.0 dB) when the upper frequency is increased to 7.0 GHz (10.5 GHz). On the other hand, increasing the upper frequency to 7.0 GHz (10.5 GHz) results in the noise figure for the broadband LNA increasing by at least 1.0 dB (2.0 dB). All relative changes in received power and noise figure were made with respect to an upper frequency of 4.8 GHz. Thus, the overall link margin will increase by at most 1.0 dB when increasing the upper frequency past 4.8 GHz, but at the expense of higher complexity and higher power consumption.

Another important criterion to keep in mind when selecting the operating bandwidth is that interferers may potentially lie within the band of interest. For example, in the United States, the U-NII band occupies the bandwidth from 5.15 GHz-5.85 GHz, while in Japan, the U-NII band occupies the bandwidth from 4.9 GHz-5.1 GHz. Both of these U-NII bands lie right in the middle of the allocated UWB spectrum 20 (see FIG. 2). If a UWB device uses an upper frequency that is larger than 6.0 GHz, then it will have to deal with the interference produced by IEEE 802.11a systems. It may be possible to mitigate, to some extent, this interference by using either static or adaptive notch filters or by using complicated baseband mitigation algorithms at the UWB receiver; but such mitigation will come at the expense of increased complexity. Conversely, the same UWB device will generate interference for IEEE 802.11a systems. To prevent generation of this interference, UWB devices will have to incorporate a notch filter at the transmitter to prevent emission within the U-NII band 22. Effectively, the presence of the U-NII band 22 breaks the UWB spectrum 20 into two distinct and orthogonal bands that are free from interference: 3.1 GHz-4.8 GHz, and 6.0 GHz-10.6 GHz (see FIG. 2).

Since the gains from using the higher band (6.0 GHz-10.6 GHz) are incremental, it would be both advantageous and desirable to provide a UWB system that uses the lower band 3.1-4.8 GHz. Other reasons for using the smaller operating bandwidth include: 1) front-end RF components, such as the LNA and mixer, can be built in current CMOS technologies with low noise figure; and 2) the signal processing can be done at lower speeds, implying that the sampling rates for the ADC can be smaller, and the timing requirement can be relaxed. As a result, the final solution will have lower complexity and can be manufactured using standard, and mature CMOS technologies, which implies an early time-to-market and low cost and low power solution.

In view of the foregoing, it would be both advantageous and desirable in the wireless data communication art to provide a physical layer for an ultra wide band (UWB) system that utilizes the unlicensed 3.1 GHz-10.6 GHz UWB band, as regulated in the United States by the Code of Federal Regulations, Title 47, Section 15. The reasons for choosing the lower band include, among others:

Incremental gains from larger operating bandwidths,
Lower sampling rates for the ADC,
Relaxed timing requirements,
Complete CMOS solutions for the proposed UWB system,
Lower cost,
Lower power,
Early time-to-market, and
Scalability.

SUMMARY OF THE INVENTION

The present invention is directed to a physical layer for an ultra wide band (UWB) system that utilizes the unlicensed 3.1

GHz-10.6 GHz UWB band, as regulated in the United States by the Code of Federal Regulations, Title 47, Section 15.

According to one embodiment, an ultra-wide-band (UWB) physical layer employs time-frequency interleaved (TFI) orthogonal frequency division multiplexing (OFDM) within the 3.1-10.6 GHz UWB band, to provide a wireless personal area network (PAN) having data payload communication capabilities of 55, 110, and 200 Mb/s.

According to another embodiment, an ultra-wide-band (UWB) physical layer comprises a UWB transmitter generating time-frequency interleaved (TFI) orthogonal frequency division multiplexed (OFDM) signals within the 3.1-10.6 GHz UWB band, such that the UWB band is divided into smaller sub-bands.

According to yet another embodiment, a modulation scheme for ultra-wideband (UWB) systems comprises the method steps of:

providing a UWB physical layer operational to generate orthogonal frequency division multiplexed (OFDM) symbols within a desired band;

interleaving the OFDM symbols across both time and frequency to divide the desired band into smaller sub-bands; and inserting a guard interval after each OFDM symbol, such that the UWB physical layer has sufficient time to switch from its current channel to the next channel.

BRIEF DESCRIPTION OF THE DRAWINGS

Other aspects and features of the present invention and many of the attendant advantages of the present invention will be readily appreciated as the aspects and features become better understood by reference to the following detailed description when considered in connection with the accompanying drawings in which like reference numerals designate like parts throughout the figures thereof and wherein:

FIG. 4 is a set of graphs showing a frequency-domain representation illustrating TFI-OFDM viewed as a full-band system;

FIG. 5 illustrates on example of the time-frequency interleaving employed by a UWB PHY according to one embodiment of the present invention;

FIG. 9 illustrates a standard PLCP preamble format;

FIG. 10 illustrates the standard streaming-mode PLCP preamble format;

FIG. 11 shows a PLCP header bit assignment according to one embodiment;

FIG. 12 depicts a convolutional encoder having rate R=1/3 and a constraint length K=7;

FIG. 13 illustrates a bit-stealing and bit-insertion procedure with R=11/32 according to one embodiment;

FIG. 14 illustrates a bit-stealing and bit-insertion procedure with R=1/2 according to one embodiment;

FIG. 17 illustrates one example of BPSK and QPSK constellation bit encoding;

FIG. 18 is a plot depicting subcarrier frequency allocation according to one embodiment;

FIG. 19 depicts a CCITT CRC-16 implementation disclosed in the IEEE 802.15.3 draft standard;

FIG. 20 shows a graph depicting a transmit power spectral density mask according to one embodiment;

FIG. 21 illustrates one example of interleaving sequences;

FIG. 22 illustrates one example of rotation sequences;

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Time-Frequency Interleaved OFDM

Figure 1:
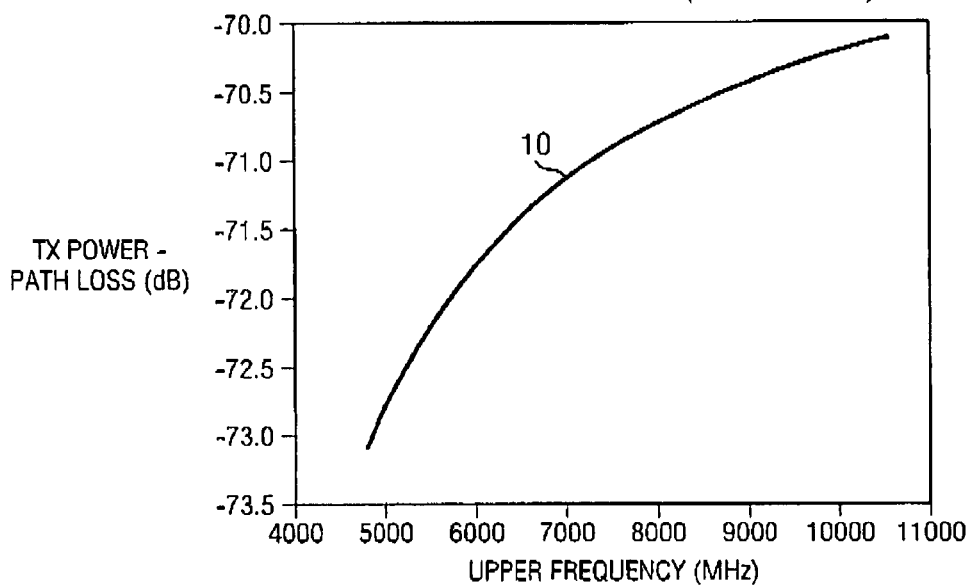
FIG. 1 is a plot showing received power at a distance of 10 meters as a function of the upper frequency.
Figure 2:
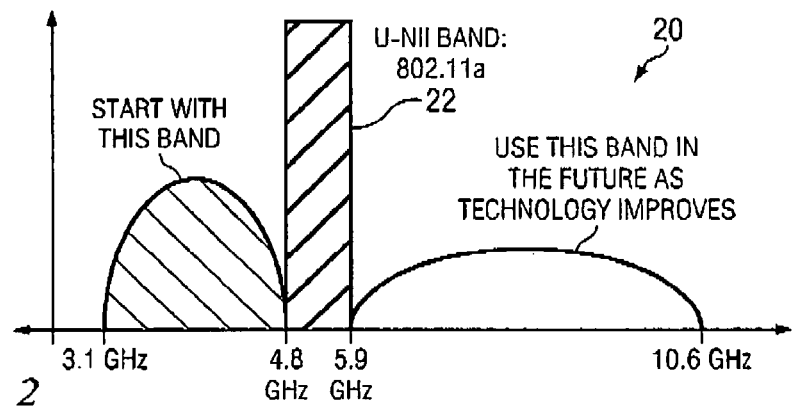
FIG. 2 is a graph showing the U-NII band within the UWB spectrum.
Figure 3:
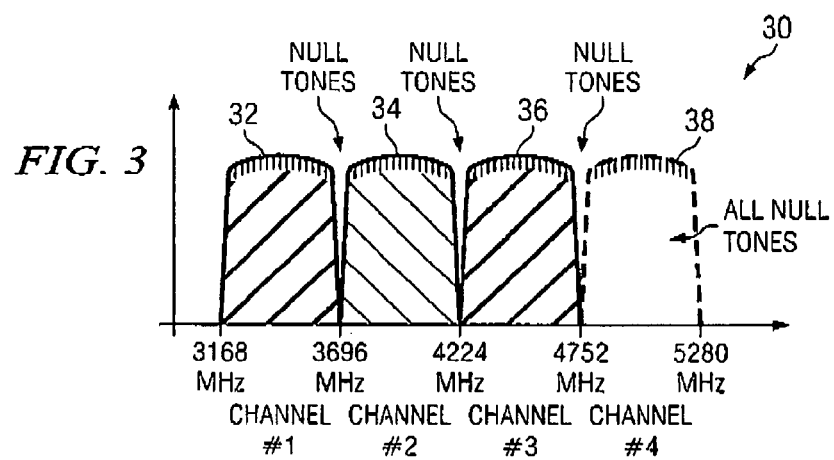
FIG. 3 is a graph showing an example of a multi-carrier OFDM system.

For a UWB system to be successful in the market place, it needs to be designed to operate in heavy multi-path environment, with possible RMS delay spreads of up to 25 ns. To achieve the best performance, the receiver needs to be able to rake in as much energy as possible. One method for collecting the energy is to use a RAKE receiver. To capture the majority of the multi-path energy, a long RAKE receiver with many fingers is typically required. Building a long RAKE receiver and assigning the many fingers to the correct delays however, can be very complicated. Another approach for combating multi-path is to use orthogonal frequency division multiplexing (OFDM). OFDM combats multi-path by introducing a cyclic prefix at the beginning of each symbol. Introducing a sufficiently long cyclic prefix ensures that the linear convolution with the channel impulse response looks like a circular convolution and that the FFT is the ideal detector at the receiver. One example of an OFDM scheme 30 that can be used for a UWB system is shown in FIG. 3. A UWB scheme according to the preferred embodiments described herein below is referred to as Time-Frequency Interleaved OFDM (TFI-OFDM). There are two ways of viewing TFI-OFDM: as either a full-band system or as a sub-band system described herein below.

TFI-OFDM as a Full-Band System

FIG. 3 shows a system that uses a 512-point IFFT with a tone spacing of 4.125 MHz to generate a signal that spans the entire bandwidth from 3168 MHz to 5280 MHz. The full-band TFI-OFDM system is similar to that of conventional OFDM except that only a contiguous subset of the tones are used for a single OFDM symbol. Between consecutive OFDM symbols, different subsets of tones are used. This is equivalent to coding the data in both time and frequency. By varying the subset of tones as a function of time (or OFDM symbol), one can lower the speed of the DAC (and correspondingly the ADC at the receiver). One can exploit the frequency diversity of the channel, and obtain the same transmit power as a full-band signal (that occupies the complete bandwidth spanned by the IFFT).

Since the minimum bandwidth requirement for a UWB signal is 500 MHz, one need not transmit on all tones to be a compliant UWB system. In fact, it is only necessary to transmit on 122 tones to generate a signal that has a bandwidth greater than 500 MHz. To simplify one implementation, one can restrict attention to subsets that contain a total of 128 consecutive tones. Therefore, the 512-point IFFT can be divided into 4 non-overlapping sets 32, 34, 36, 38 of 128 tones. Since only 128 tones are used to generate a single OFDM symbol, the 512-point IFFT can be replaced by a much lower complexity 128-point IFFT.

One example of how the data is transmitted on different subsets of tones 40 is shown in FIG. 4. In this example, data is transmitted in the first OFDM symbol 42 on the first 128 tones (tones 1 through 128). For the second OFDM symbol 44, data is transmitted on tones 257 through 384 (third set of tones). For the third OFDM symbol 46, the data is transmitted on tones 129 through 256 (second set of tones). For the fourth OFDM symbol 48, the data is transmitted on the first 128 tones (tones 1 through 128), and so on. The period for this time-frequency coding pattern is three.

TFI-OFDM as a Sub-Band System

An alternative view 50 of the time-frequency coding of TFI-OFDM in the time-domain is shown in FIG. 5, where the OFDM symbols are interleaved across both time and frequency. In this example, the first OFDM symbol 52 is transmitted on channel #1, the second OFDM symbol 54 is transmitted on channel #3, the third OFDM symbol 56 is transmitted on channel #2, the fourth OFDM symbol 58 is transmitted on channel #1, and so on. In this example, it is implicitly assumed that the time-frequency interleaving is performed across three OFDM symbols; however, in practice, the interleaving period can be much longer. The exact length and pattern of the time-frequency interleaving may differ from superframe to superframe and piconet to piconet.

From this figure, one can also see that a guard interval 59 is inserted after each OFDM symbol. By inserting the guard interval 59 between OFDM symbols, one can reduce the complexity of the transmitter. Instead of using a 512-point IFFT and a single carrier frequency, one can implement the same system using a 128-point IFFT and variable carrier frequencies. The reason that one can use a 128-point IFFT is that data is transmitted only on 128 of the 512 tones that are available at the IFFT. The guard interval 59 is included to ensure that the transmitter and receiver have sufficient time to switch from the current channel to the next channel. Thus, the TFI-OFDM system can be viewed as both a full-band UWB system and as a sub-band UWB system.

Figure 6:
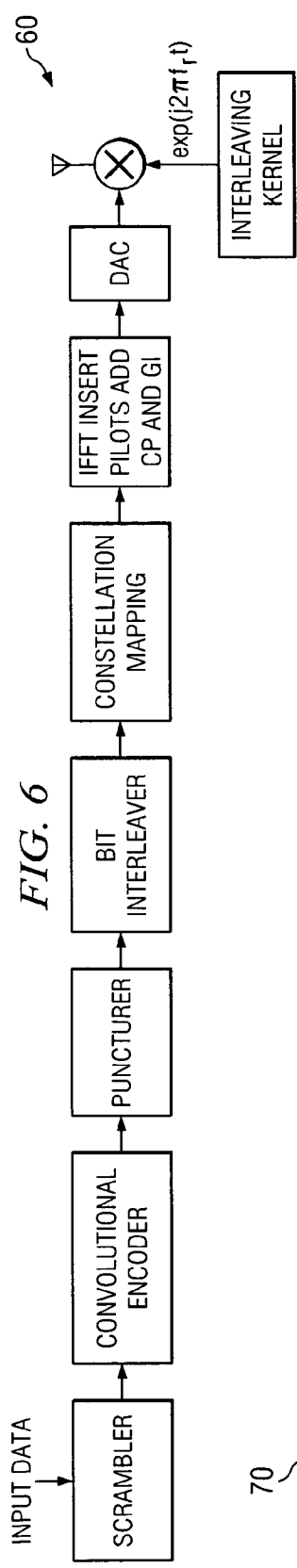
FIG. 6 is a block diagram showing a UWB PHY transmitter architecture according to one embodiment of the present invention.

An example of a block diagram for a transmit architecture 60 that implements the TFI-OFDM PHY is shown in FIG. 6. Note that this transmitter 60 does indeed generate the signals shown in FIG. 4 and FIG. 5. The structure of the transmitter 60 is very similar to that of a conventional wireless OFDM physical layer, except that the carrier frequency is changed according to the interleaving kernel. Details about the implementation of each of the individual blocks of the transmitter 60 are described herein below.

Finally, since only a subset of the tones are transmitted at any one time and since the subset changes from one OFDM symbol to the next, the TFI-OFDM system can be looked upon as a full-band system or can also be interpreted as a sub-band system employing OFDM on each of the sub-bands.

Advantages of a TFI-OFDM System

The present inventors found the TFI-OFDM system to be advantageous as follows:

1. Suitability for CMOS implementation: Using only the lower bandwidth (3.1 GHz-4.8 GHz) allows the TFI-OFDM system to be manufactured completely in current CMOS technology;

2. U-NII interference suppression is easier: Since the TFI-OFDM system completely avoids all transmission in the U-NII band, the front-end filter design for rejecting interference from the U-NII band is simplified;

3. TFI-OFDM requires only one transmitter chain and one receiver chain: The guard interval 59 ensures that only one transmit chain is needed to generate the TFI-OFDM waveform and that a single RF chain is sufficient to receive the transmitted signals at all times;

4. Early time-to-market: The majority of the TFI-OFDM system can be implemented in standard digital CMOS logic; and because of the advantages stated above, the analog implementation complexity can be minimized, which results in an early time-to-market;

5. Excellent robustness to multi-path: OFDM modulation has inherent robustness to multi-path channel environments and needs only a single-tap frequency-domain equalizer;

6. Compliance with worldwide regulations: Channels and individual tones can be dynamically turned on and off in order to comply with changing regulations;

7. Coexistence with future systems: Channels and individual tones can be dynamically turned on and off for enhanced coexistence with future systems;

8. Excellent robustness to narrow-band interference: OFDM modulation, which is the basis for TFI-OFDM, is inherently robust against single tone and narrowband interferers; and 9. Antenna is easier to design: OFDM has an inherent robustness against gain, phase, and group delay variation that may be introduced by a broadband antenna.

UWB System Description:

Mathematical Description of the Signal

The transmitted signals can be described using a complex baseband signal notation. The actual RF transmitted signal is related to the complex baseband signal as follows:

$$r_{RF}(t) = \text{Re}\left\{\sum_{k=0}^{N-1} r_k(t - kT_{SYM})\exp(j2\pi f_k t)\right\},$$

where Re( ) represents the real part of a complex variable, $r_k(t)$ is the complex baseband signal of the $k^{th}$ OFDM symbol and is nonzero over the interval from 0 to $T_{SYM}$, N is the number of OFDM symbols, $T_{SYM}$ is the symbol interval, and $f_k$ is the center frequency for the $k^{th}$ channel. The exact structure of the $k^{th}$ OFDM symbol depends on its location within the packet:

$$r_k(t) = \begin{cases} r_{preamble,k}(t) & 0 \leq k < N_{preamble} \\ r_{header,k-N_{preamble}}(t) & N_{preamble} \leq k < N_{header} \\ r_{data,k-N_{preamble}}(t) & N_{header} \leq k < N_{data}, \end{cases}$$

The structure of each component of $r_k(t)$ as well as the offsets $N_{preamble}$, $N_{header}$ and $N_{data}$ are described in more detail herein below.

All of the OFDM symbols $r_k(t)$ can be constructed using an inverse Fourier transform with a certain set of coefficients $C_n$, where the coefficients are defined as either data, pilots, or training symbols:

$$r_k(t) = \begin{cases} \sum_{n=-\frac{N_{ST}}{2}}^{\frac{N_{ST}}{2}} C_n \exp(j2\pi n \Delta_f)(t - T_{CP}) & t \in [0, T_{FFT} + T_{CP}] \\ 0 & t \in [T_{FFT} + T_{CP}, T_{FFT} + T_{CP} + T_{GI}] \end{cases}$$

The parameters $_f$ and $N_{ST}$ are defined as the subcarrier frequency spacing and the number of total subcarriers used, respectively. The resulting waveform has a duration of $T_{FFT}=1/_f$. Shifting the time by $T_{CP}$ creates the "circular prefix" which is used in OFDM to mitigate the effects of multi-path. The parameter $T_{GI}$ is the guard interval 59 duration.

Discrete-Time Implementation Considerations

Figure 7:
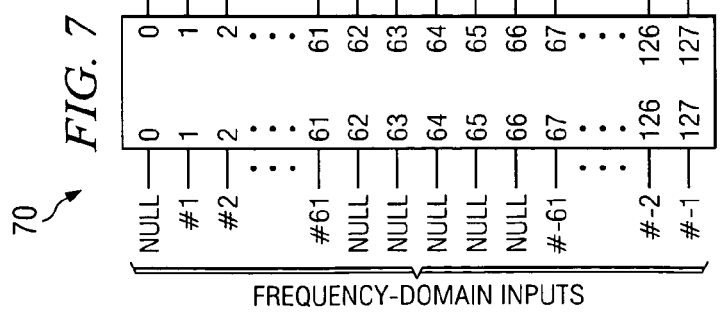
FIG. 7 illustrates mapping associated with the inputs and outputs of an inverse Fast Fourier Transform (IFFT) according to one embodiment.
Figure 16:
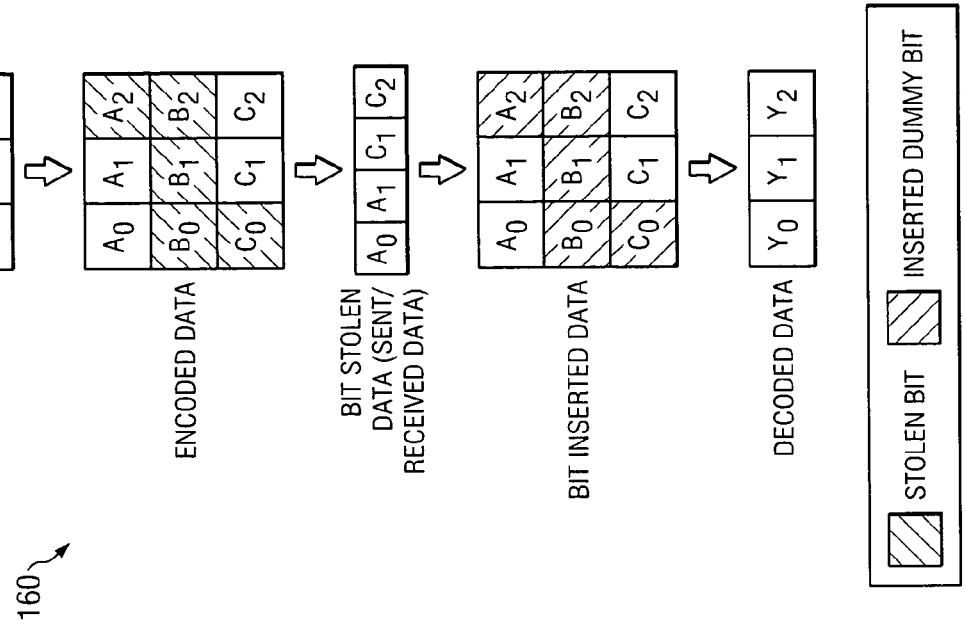
FIG. 16 illustrates a bit-stealing and bit-insertion procedure with R=3/4 according to one embodiment.
Figure 15:
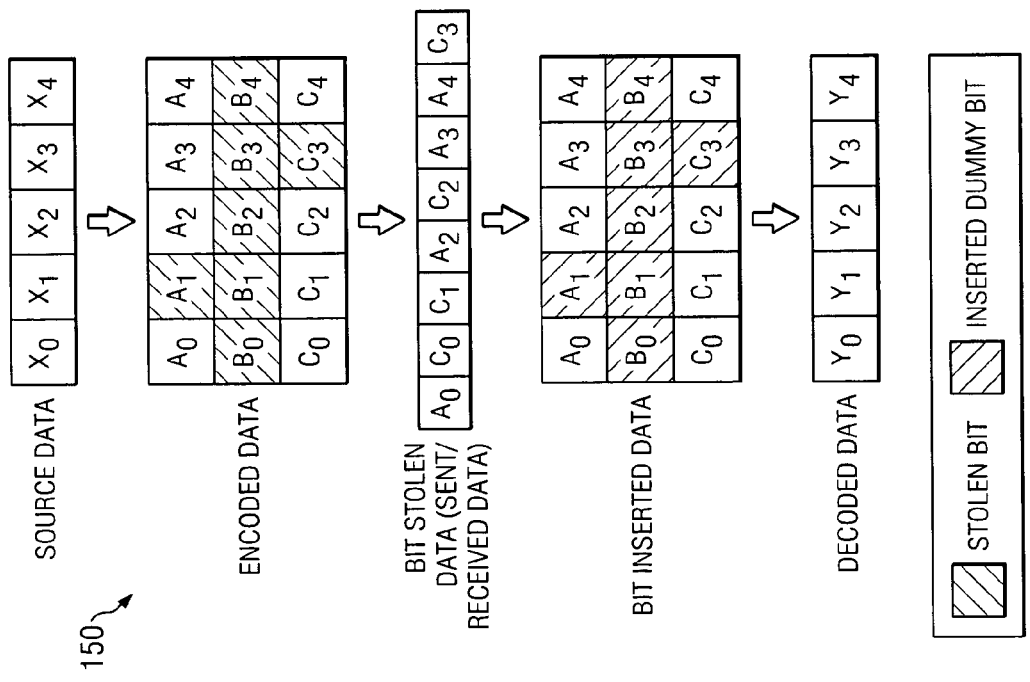
FIG. 15 illustrates a bit-stealing and bit-insertion procedure with R=5/8 according to one embodiment.

A description of the discrete time implementation is informational, and is set forth herein below in order to facilitate a more thorough description of the preferred embodiments and to better understand the preferred embodiments. The common way to implement the inverse Fourier transform is by an inverse Fast Fourier Transform (IFFT) algorithm. If, for example, a 128-point IFFT is used, the coefficients 1 to 61 are mapped to the same numbered IFFT inputs, while the coefficients −61 to −1 are copied into IFFT inputs 67 to 127. The rest of the inputs, 27 to 37 and the 0 (DC) input, are set to zero. This mapping 70 is illustrated in FIG. 7. After performing the IFFT, the output is cyclically extended and a guard interval 59 is added to generate an output with the desired length.

PHY Services Provided to the IEEE 802.15.3 Wireless PAN MAC

The OFDM PHY layer consists of two protocol functions, as follows:

a) A PHY convergence function, which adapts the capabilities of the physical medium dependent (PMD) system to the PHY service. This function is supported by the physical layer convergence procedure (PLCP), which defined a method of mapping the IEEE 802.11 PHY sublayer service data units (PSDU) into a framing format suitable for sending and receiving user data and management information between two or more stations using the associated PMD system; and b) A PMD system whose function defines the characteristics and method of transmitting and receiving data through a wireless medium between two or more stations, each using the OFDM system.

UWB PHY Function

The UWB PHY contains three functional entities: the PMD function, the PHY convergence function, and the layer management function. The UWB PHY service is provided to the MAC through the PHY service primitives.

PLCP Sublayer

In order to allow the IEEE 802.15.3 MAC to operate with minimum dependence on the PMD sublayer, a PHY convergence sublayer is defined. This function simplifies the PHY service interface to the IEEE 802.15.3 MAC services.

PMD Sublayer

The PMD sublayer provides a means to send and receive data between two or more stations.

PHY Management Entity (PLME)

The PLME performs management of the local PHY functions in conjunction with the MAC management entity.

UWB PHY Specific Service Parameter List

Some PHY implementations require medium management state machines running in the MAC sublayer in order to meet certain PMD requirements. These PHY-dependent MAC state machines reside in a sublayer defined as the MAC sublayer management entity (MLME). In certain PMD implementations, the MLME may need to interact with the PLME as part of the normal PHY SAP primitives. These interactions are defined by the PLME parameter list currently defined in the PHY services primitives as TXVECTOR and RXVECTOR. The list of these parameters, and the values they may represent, are defined in the PHY specification for each PMD. This description addresses the TXVECTOR and RXVECTOR for the OFDM PHY.

TXVECTOR Parameter

The parameters in Table 1 below are defined as part of the TXVECTOR parameter list in the PHY-TXSTART request service primitive.

TABLE 1

TXVECTOR parameters

| Parameter | Associate Primitive | Value |
| --- | --- | --- |
| LENGTH | PHY-TXSTART.request (TXVECTOR) | 1-4095 |
| DATARATE | PHY-TXSTART.request (TXVECTOR) | 55, 80, 1 10, 160, 200, 320 and 480 (Support for 55, 1 10, and 200 data rates is mandatory.) |
| SCRAMBLER_INIT | PHY-TXSTART.request (TXVECTOR) | Scrambler initialization: 2 null bits |
| TXPWR_LEVEL | PHY-TXSTART.request (TXVECTOR) | 1-8 |

TXVECTOR LENGTH

The allowed values for the LENGTH parameter are in the range 1-4095. This parameter is used to indicate the number of octets in the frame payload (which does not include the PCS), which the MAC is currently requesting the PHY to transmit. This value is used by the PHY to determine the number of octets transfers that will occur between the MAC and the PHY after receiving a request to start the transmission.

TXVECTOR DATARATE

The DATARATE parameter describes the bit rate at which the PLCP shall transmit the PSDU. Its value can be any of the rates defined in Table 1. Data rates of 55, 110, and 200 Mb/s must be supported; while other rates may also be supported.

TXVECTOR SCRAMBLER_INIT

The SCRAMBLER_INIT parameter consists of 2 null bits used for the scrambler initialization.

TXVECTOR TXPWR_LEVEL

The allowed values for the TXPWR_LEVEL parameter are in the range from 1-8. This parameter is used to indicate which of the available TxPowerLevel attributes defined in the MIB are used for the current transmission.

RXVECTOR Parameters

The parameters in Table 2 below are defined as part of the RXVECTOR parameter list in the PHY-RXSTART. indicate service primitive.

TABLE 2

RXVECTOR parameters

| Parameter | Associate Primitive | Value |
| --- | --- | --- |
| LENGTH | PHY-RXSTART.indicate (RXVECTOR) | 1-4095 |
| RSSI | PHY-RXSTART.indicate (RXVECTOR) | 0-RSSI maximum |
| DATARATE | PHY-RXSTART.indicate (RXVECTOR) | 55, 80, 1 10, 160, 200, 320, and 480 |

RXVECTOR LENGTH

The allowed values for the LENGTH parameter are in the range 1-4095. This parameter is used to indicate the value contained in the LENGTH field that the PLCP has received in the PLCP header. The MAC and the PLCP will use this value to determine the number of octet transfers that will occur between the two sublayers during the transfer of the received PSDU.

RXVECTOR RSSI

The allowed values for the receive signal strength indicator (RSSI) parameter are in the range from 0 through RSSI maximum. This parameter is a measure by the PHY sublayer of the energy observed at the antenna used to receive the current PSDU. RSSI must be measured during the reception of the PLCP preamble. RSSI is used in a relative manner, and must be a monotonically increasing function of the received power.

RXVECTOR DATARATE

DATARATE represents the data rate at which the current PPDU was received. The allowed values of the DATARATE are 55, 80, 110, 160, 200, 320, or 480.

UWB PLCP Sublayer

A method for converting the PSDUs to PPDUs is described herein below. During the transmission, the PSDU is provided with a PLCP preamble and header to create the PPDU. At the receiver, the PLCP preamble and header are processed to aid in the demodulation, decoding, and delivery of the PSDU.

PLCP Frame Format

Figure 8:
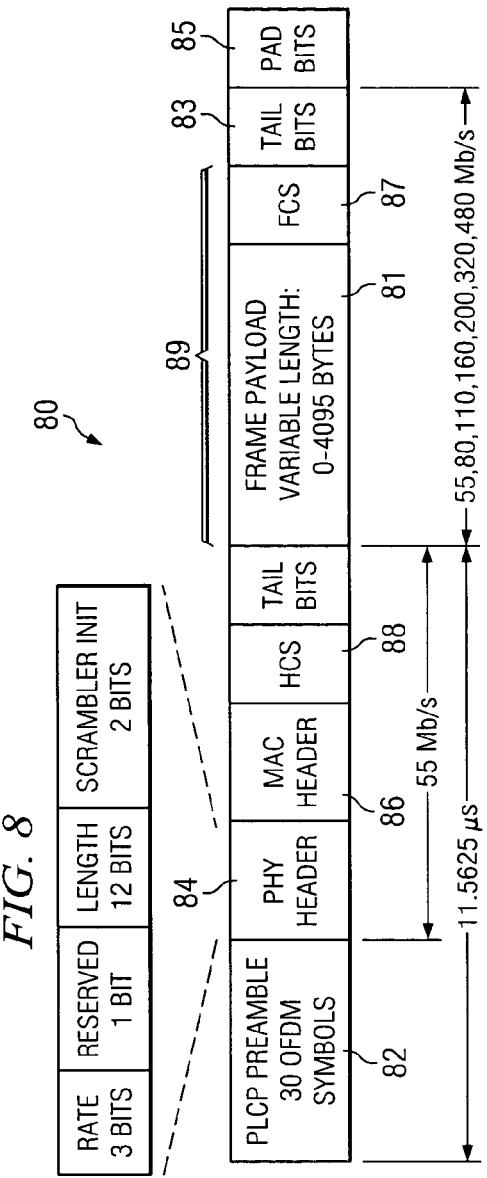
FIG. 8 shows the format for a PHY frame including the PLCP preamble according to one embodiment.

FIG. 8 shows the format for the PHY frame 80 including the PLCP preamble 82, PLCP and MAC headers 84,86, header check sequence 88, MAC frame body 89 (frame payload plus PCS), tail bits 83, and pad bits 85. The PHY layer first pre-appends the PLCP header 84 to the MAC header 86 and then calculates the HCS 88 over the combined PLCP and MAC headers 84,86. The resulting HCS 88 is appended to the end of the MAC header 86. Tail bits 83 are added to the MAC frame body 89 (i.e., the frame payload plus PCS) in order to return the convolutional encoder to the "zero state". If the size of the MAC frame 89 body plus tail bits 83 are not an integer multiple of the bits/OFDM symbol, then pad bits (PD) 85 are added to the end of the tail bits 83 in order to align the data stream on the OFDM symbol boundaries. The PLCP preamble 82 is sent first, followed by the PLCP header 84, MAC header 86, and HCS 88, followed by the frame payload 81, the FCS 87, the tail bits 83, and finally the pad bits 85. As shown in FIG. 8, the PLCP header 84, MAC header 86, and HCS 88 are sent at an information data rate of 55 Mb/s. The remainder of the PLCP frame (frame payload 81, FCS 87, tail bits 83, and pad bits 85) is sent at the desired information data rate of 55, 80, 110, 160, 200, 320, or 480 Mb/s.

RATE-Dependent Parameters

The data rate dependent modulation parameters are listed in Table 3 below.

TABLE 3

Rate-dependent parameters

| Data Rate (Mb/s) | Modulation | Coding rate (R) | Conjugate Symmetric Input to IFFT | Spreading Across Tones | Spreading Gain | Coded bits per OFDM symbol | Data bits per OFDM symbol ($N_{DDP}^5$) |
|---|---|---|---|---|---|---|---|
| 55 | QPSK | 11/32 | Yes | Yes | 4 | 50 | 17.1875 |
| 80 | QPSK | 1/2 | Yes | Yes | 4 | 50 | 25 |
| 110 | QPSK | 11/32 | Yes | No | 2 | 100 | 34.375 |
| 160 | QPSK | 1/2 | Yes | No | 2 | 100 | 50 |
| 200 | QPSK | 5/8 | Yes | No | 2 | 100 | 62.5 |
| 320 | QPSK | 1/2 | No | No | 1 | 200 | 100 |
| 480 | QPSK | 3/4 | No | No | 1 | 200 | 150 |

Timing-Related Parameters

A list of the timing parameters associated with the OFDM PHY is listed in Table 4 below.

TABLE 4

Timing-related parameters

| Parameter | Value |
|---|---|
| $N_{SD}$: Number of data subcarriers | 100 |
| $N_{SDP}$: Number of defined pilot carriers | 12 |
| $N_{SUP}$: Number of undefined pilot carriers | 10 |
| $N_{ST}$: Number of total subcarriers used | 122 (= $N_{SD} + N_{SDP} + N_{SUP}$) |
| $_F$: Subcarrier frequency spacing | 4.125 MHz (=528 MHz/128) |
| $T_{FFT}$: IFFT/FFT period | 242.42 ns($1/_F$) |
| $T_{CP}$: Cyclic prefix duration | 60.6 Ins (=32/528 MHz) |
| $T_{GI}$: Guard interval duration | 9.47 ns (=5/528 MHz) |
| $T_{SYM}$: Symbol interval | 3 12.5 ns ($T_{CP} + T_{FFT} + T_{GI}$) |
| $T_{PREAMBLE}$: PLCP preamble duration | 9.375 μS |

PLCP Preamble

A standard PLCP preamble must be added prior to the PLCP header to aid receiver algorithms related to synchronization, carrier-offset recovery, and channel estimation. The standard PLCP preamble 90, which is shown in FIG. 9, consists of three distinct portions: packet synchronization sequence 92, frame synchronization sequence 94, and the channel estimation sequence 96. The packet synchronization sequence 92 is constructed by successively appending 21 periods, denoted as $\{PS_0, PS_1, \ldots PS_{20}\}$, of the time-domain sequence defined in Table 5 below. Each period of the timing synchronization sequence is constructed by cyclically extending the 128-length sequence (defined in Table 5) by 32 samples and by appending a guard interval of 5 "zero samples". This portion of the preamble can be used for packet detection and acquisition, coarse carrier frequency estimation, and coarse symbol timing.

Similarly, the frame synchronization sequence 94 is constructed by successively appending 3 periods, denoted as $\{FS_0, FS_1, FS_2\}$, of a 180 degree rotated version of the time-domain sequence specified in Table 5. Again, each period of the frame synchronization sequence is constructed by cyclically extending the 128-length sequence (defined in Table 5) by 32 samples and by appending a guard interval of 5 "zero samples". This portion of the preamble cart be used to synchronize the receiver algorithm within the preamble.

Finally, the channel estimation sequence 96 is constructed by successively appending 6 periods, denoted as $\{CE_0, CE_1, \ldots, CE_5\}$, of the OFDM training symbol. This training symbol is generated by passing the frequency-domain sequence, defined in Table 6 below, though the IFFT, and adding a cyclic prefix and a guard interval to the resulting time-domain output. This portion of the preamble can be used to estimate the channel frequency response, for fine carrier frequency estimation, and fine symbol timing.

In addition to a standard PLCP preamble, a streaming-mode PLCP preamble is also described herein below. In a streaming packet mode, the first packet uses the standard PLCP preamble, while the remaining packets (second packet and on), which are separated by a MIPS time, use the streaming-mode PLCP preamble instead of the standard PLCP preamble. The streaming-mode PLCP preamble 100, which is shown in FIG. 10, consists of three distinct portions: packet synchronization sequence 102, frame synchronization sequence 104, and the channel estimation sequence 106. The packet synchronization sequence 102 is constructed by successively appending 6 periods, denoted as $\{PS_0, PS_1, \ldots PS_5\}$, of the time-domain sequence defined in Table 5. Each period of the timing synchronization sequence is constructed by cyclically extending the 128-length sequence (defined in Table 5) by 32 samples and by appending a guard interval of 5 "zero samples". This portion of the preamble can be used for packet detection and acquisition, coarse carrier frequency estimation, and coarse symbol timing.

Similarly, the frame synchronization sequence 104 is constructed by successively appending 3 periods, denoted as $\{FS_0, FS_1, FS_2\}$, of an 180 degree rotated version of the time-domain sequence specified in Table 5. Again, each period of the frame synchronization sequence is constructed by cyclically extending the 128-length sequence (defined in Table 5) by 32 samples and by appending a guard interval of 5 "zero samples". This portion of the preamble can be used to synchronize the receiver algorithm within the preamble.

Finally, the channel estimation sequence 106 is constructed by successively appending 6 periods, denoted as $\{CE_0, CE_1, \ldots, CE_5\}$, of the OFDM training symbol. This training symbol is generated by passing the frequency-domain sequence, defined in Table 6, though the IFFT, and adding a cyclic prefix and a guard interval to the resulting time-domain output. This portion of the preamble can be used to estimate the channel frequency response, for fine carrier frequency estimation, and fine symbol timing.

TABLE 5

Time-domain packet synchronization sequence

| Sequence Element | Value |
|---|---|
| $c_0$ | 1 |
| $c_1$ | 1 |
| $c_2$ | -1 |
| $c_3$ | 1 |
| $c_4$ | 1 |
| $c_5$ | -1 |
| $c_6$ | -1 |
| $c_7$ | -1 |
| $c_8$ | 1 |
| $c_9$ | 1 |
| $c_{10}$ | -1 |
| $c_{11}$ | 1 |
| $c_{12}$ | 1 |
| $c_{13}$ | -1 |
| $c_{14}$ | -1 |
| $c_{15}$ | -1 |
| $c_{16}$ | 1 |
| $c_{17}$ | 1 |
| $c_{18}$ | -1 |
| $c_{19}$ | 1 |
| $c_{20}$ | 1 |
| $c_{21}$ | -1 |
| $c_{22}$ | -1 |
| $c_{23}$ | -1 |
| $c_4$ | 1 |
| $c_{25}$ | 1 |
| $c_{26}$ | -1 |
| $c_{27}$ | 1 |
| $c_{28}$ | 1 |
| $c_{29}$ | -1 |
| $c_{30}$ | -1 |
| $c_{31}$ | -1 |
| $c_{32}$ | -1 |
| $c_{33}$ | -1 |
| $c_{34}$ | 1 |
| $c_{35}$ | -1 |
| $c_{36}$ | -1 |
| $c_{37}$ | 1 |
| $c_{38}$ | 1 |
| $c_{39}$ | 1 |
| $c_{40}$ | -1 |
| $c_{41}$ | -1 |
| $c_{42}$ | 1 |
| $c_{43}$ | -1 |
| $c_{44}$ | -1 |
| $c_{45}$ | 1 |
| $c_{46}$ | 1 |
| $c_{47}$ | 1 |
| $c_{48}$ | -1 |
| $c_{49}$ | -1 |
| $c_{50}$ | 1 |
| $c_{51}$ | -1 |
| $c_{52}$ | -1 |
| $c_{53}$ | 1 |
| $c_{54}$ | 1 |
| $c_{55}$ | 1 |
| $c_{56}$ | 1 |
| $c_{57}$ | 1 |
| $c_{58}$ | -1 |
| $c_{59}$ | 1 |
| $c_{60}$ | 1 |
| $c_{61}$ | -1 |
| $c_{62}$ | -1 |
| $c_{63}$ | -1 |
| $c_{64}$ | -1 |
| $c_{65}$ | -1 |
| $c_{66}$ | 1 |
| $c_{67}$ | -1 |
| $c_{68}$ | -1 |
| $c_{69}$ | 1 |
| $c_{70}$ | 1 |
| $c_{71}$ | 1 |
| $c_{72}$ | 1 |
| $c_{73}$ | 1 |
| $c_{74}$ | -1 |
| $c_{75}$ | 1 |
| $c_{76}$ | 1 |
| $c_{77}$ | -1 |
| $c_{78}$ | -1 |
| $c_{79}$ | -1 |
| $c_{80}$ | -1 |
| $c_{81}$ | -1 |
| $c_{82}$ | 1 |
| $c_{83}$ | -1 |
| $c_{84}$ | -1 |
| $c_{85}$ | 1 |
| $c_{86}$ | 1 |
| $c_{87}$ | 1 |
| $c_{88}$ | 1 |
| $c_{89}$ | 1 |
| $c_{90}$ | -1 |
| $c_{91}$ | 1 |
| $c_{92}$ | 1 |
| $c_{93}$ | -1 |
| $c_{94}$ | -1 |
| $c_{95}$ | -1 |
| $c_{96}$ | 1 |
| $c_{97}$ | 1 |
| $c_{98}$ | -1 |
| $c_{99}$ | 1 |
| $c_{100}$ | 1 |
| $c_{101}$ | -1 |
| $c_{102}$ | -1 |
| $c_{103}$ | -1 |
| $c_{104}$ | -1 |
| $c_{105}$ | -1 |
| $c_{106}$ | 1 |
| $c_{107}$ | -1 |
| $c_{108}$ | -1 |
| $c_{109}$ | 1 |
| $c_{110}$ | 1 |
| $c_{111}$ | 1 |
| $c_{112}$ | 1 |
| $c_{113}$ | 1 |
| $c_{114}$ | -1 |
| $c_{115}$ | 1 |
| $c_{116}$ | 1 |
| $c_{117}$ | -1 |
| $c_{118}$ | -1 |
| $c_{119}$ | -1 |
| $c_{120}$ | 1 |
| $c_{121}$ | 1 |
| $c_{122}$ | -1 |
| $c_{123}$ | 1 |
| $c_{124}$ | 1 |
| $c_{125}$ | -1 |
| $c_{126}$ | -1 |
| $c_{127}$ | -1 |

TABLE 6

Frequency-domain OFDM training sequence

| Tone Number | Value |
|---|---|
| -56 | 1 |
| -55 | -1 |
| -54 | -1 |
| -53 | 1 |
| -52 | -1 |
| -51 | -1 |
| -50 | 1 |
| -49 | 1 |
| -48 | -1 |

TABLE 6-continued

Frequency-domain OFDM training sequence

| Tone Number | Value |
|---|---|
| −47 | 1 |
| −46 | −1 |
| −45 | −1 |
| −44 | −1 |
| −43 | 1 |
| −42 | −1 |
| −41 | 1 |
| −40 | 1 |
| −39 | −1 |
| −38 | −1 |
| −37 | −1 |
| −36 | 1 |
| −35 | −1 |
| −34 | −1 |
| −33 | −1 |
| −32 | 1 |
| −31 | 1 |
| −30 | 1 |
| −29 | 1 |
| −28 | 1 |
| −27 | −1 |
| −26 | 1 |
| −25 | 1 |
| −24 | 1 |
| −23 | −1 |
| −22 | 1 |
| −21 | −1 |
| −20 | 1 |
| −19 | −1 |
| −18 | −1 |
| −17 | 1 |
| −16 | −1 |
| −15 | −1 |
| −14 | −1 |
| −13 | 1 |
| −12 | 1 |
| −11 | −1 |
| −10 | 1 |
| −9 | 1 |
| −8 | 1 |
| −7 | −1 |
| −6 | −1 |
| −5 | 1 |
| −4 | 1 |
| −3 | 1 |
| −2 | 1 |
| −1 | 1 |
| 1 | 1 |
| 2 | 1 |
| 3 | 1 |
| 4 | 1 |
| 5 | 1 |
| 6 | −1 |
| 7 | −1 |
| 8 | 1 |
| 9 | 1 |
| 10 | 1 |
| 11 | −1 |
| 12 | 1 |
| 13 | 1 |
| 14 | −1 |
| 15 | −1 |
| 16 | −1 |
| 17 | 1 |
| 18 | −1 |
| 19 | −1 |
| 20 | 1 |
| 21 | −1 |
| 22 | 1 |
| 23 | −1 |
| 24 | 1 |
| 25 | 1 |
| 26 | 1 |
| 27 | −1 |

TABLE 6-continued

Frequency-domain OFDM training sequence

| Tone Number | Value |
|---|---|
| 28 | 1 |
| 29 | 1 |
| 30 | 1 |
| 31 | 1 |
| 32 | 1 |
| 33 | −1 |
| 34 | −1 |
| 35 | −1 |
| 36 | 1 |
| 37 | −1 |
| 38 | −1 |
| 39 | −1 |
| 40 | 1 |
| 41 | 1 |
| 42 | −1 |
| 43 | 1 |
| 44 | −1 |
| 45 | −1 |
| 46 | −1 |
| 47 | 1 |
| 48 | −1 |
| 49 | 1 |
| 50 | 1 |
| 51 | −1 |
| 52 | −1 |
| 53 | 1 |
| 54 | −1 |
| 55 | −1 |
| 56 | 1 |

Header Modulation

The PLCP header, MAC header, HCS, and tail bits are modulated using an information data rate of 55 Mb/s.

PLCP Header

The OFDM training symbols are followed by the PLCP header, which contains the RATE of the MAC frame body, the length of the frame payload (which does not include the PCS), and the seed identifier for the data scrambler. The RATE field conveys the information about the type of modulation, the coding rate, and the spreading factor used to transmit the MAC frame body.

The PLCP header field 110 is composed of 18 bits, as illustrated in FIG. 11. The first three bits 0 to 2 encode the RATE 112. Bit 3 is reserved for future use. Bits 4-15 encode the LENGTH field 114, with the least significant bit (LSB) being transmitted first. Bits 16-17 encode the initial state of the scrambler 116, which is used to synchronize the descrambler of the receiver.

Date Rate (RATE)

Depending on the information data rate (RATE) 112, the bits R1-R3 are set according to the values in Table 7 below.

TABLE 7

Rate-dependent parameters

| Rate (Mb/s) | R1-R3 |
|---|---|
| Reserved | 110 |
| 55 | 011 |
| 80 | 111 |
| 110 | 001 |
| 160 | 101 |
| 200 | 010 |

TABLE 7-continued

Rate-dependent parameters

| Rate (Mb/s) | R1-R3 |
|---|---|
| 320 | 100 |
| 480 | 000 |

The encoding of the RATE field 112 values is chosen in such a way as to simplify the decoding process.

PLCP Length Field (LENGTH)

The PLCP Length field 114 is an unsigned 12-bit integer that indicates the number of octets in the frame payload (which does not include the PCS, the tail bits, or the pad bits).

PLCP Scrambler Field (SCRAMBLER)

The bits S1-S2 are set according to the scrambler 116 seed identifier value. This two-bit value corresponds to the seed value chosen for the data scrambler 116.

Data Scrambler

A side-stream scrambler is used for the MAC header, HCS, and MAC frame body. The PLCP preamble, PLCP header, tail bits, and pad bits are not scrambled. The polynomial generator, g(D), for the pseudo random binary sequence (PRBS) generator is $g(D)=1+D^{14}+D^{15}$, where D is a single bit delay element. The polynomial not only forms a maximal length sequence, but is also a primitive polynomial. Using this generator polynomial, the corresponding PRBS, $x_n$, is generated as $$x_n = x_{n-14} \oplus x_{n-15}$$

where "$\oplus$" denotes modulo-2 addition. The following sequence defines the initialization sequence, $x_{init}$, which is specified by the parameter "seed value" shown in Table 8 below.

$$x_{init} = [x_{n-1}^i x_{n-2}^i \ldots x_{n-14}^i x_{n-15}^i]$$

where $x_{n-k}^i$ represents the binary initial value at the output of the $k^{th}$ delay element.

The scrambled data bits, $s_n$, are obtained as follows:

where $b_n$ represents the unscrambled data bits. The side-stream de-scrambler at the receiver is initialized with the same initialization vector, $x_{init}$, used in the transmitter scrambler. The initialization vector is determined from the seed identifier contained in the PLCP header of the received frame.

The 15-bit seed value corresponds to the seed identifier as shown in Table 8. The seed identifier value is set to 00 when the PHY is initialized and is incremented in a 2-bit rollover counter for each frame that is sent by the PHY. The value of the seed identifier that is used for the frame is sent in the PLCP header.

TABLE 8

Scrambler seed selection

| Seed identifier ($b_1, b_0$) | Seed value ($X_{14} \ldots X_0$) |
|---|---|
| 0,0 | 0011 1111 1111 111 |
| 0,1 | 0111 1111 1111 111 |
| 1,0 | 1011 1111 1111 111 |
| 1,1 | 1111 1111 1111 111 |

Tail Bits

The tail bit field is six bits of "0", which are required to return the convolutional encoder to the "zero state". This procedure improves the error probability of the convolutional decoder, which relies on the future bits when decoding the message stream. The tail bit field following the HCS is produced by replacing six "zero" bits following the end of the HCS with six non-scrambled "zero" bits. Similarly, the tail bit field following the MAC frame body is produced by replacing six "zero" bits following the end of the MAC frame body with six non-scrambled "zero" bits.

Convolutional Encoder

The PLCP header, MAC header, and HCS are coded with a convolutional encoder of rate R=11/32. The MAC frame body and tail bits are coded with a convolutional encoder of rate R=11/32, 1/2, 5/8, or 3/4, corresponding to the desired data rate. The convolutional encoder 120 uses the rate R=1/3 industry-standard generator polynomials, $g_0=133_8$, $g_1=145_8$, and $g_2=175_8$, as shown in FIG. 12. The bit denoted as "A" is the first bit generated by the encoder 120, followed by the bit denoted as "B", and finally, by the bit denoted as "C". The various coding rates are derived from the rate R=1/3 convolutional code by employing "puncturing". Puncturing is a procedure for omitting some of the encoded bits in the transmitter (thus reducing the number of transmitted bits and increasing the coding rate) and inserting a dummy "zero" metric into the convolutional decoder on the receive side in place of the omitted bits. The puncturing patterns 130, 140, 150, 160 are illustrated in FIG. 13 through FIG. 16. Decoding by the Viterbi algorithm is recommended.

Pad Bits

Pad bits are inserted after the convolutional encoder and puncturer to ensure that the encoded data stream is a multiple of the number of coded bits in an OFDM symbol, $N_{CBPS}$. The number of pad bits that are inserted is a function of the code rate R and the number of bits in the frame payload (LENGTH), PCS, and tail bits. The number of OFDM symbols, $N_{SYM}$, the number of coded bits, $N_{CB}$, and the number of pad bits, $N_{PAD}$, are computed as follows:

$$N_{SYM} = \text{Ceiling}[\text{Ceiling}[1/R \times (8 \times (\text{LENGTH} + FCS) + 6)]/N_{CBPS}]$$

$$N_{CB} = N_{SYM} \times N_{CBPS}$$

$$N_{PAD} = N_{CB} - \text{Ceiling}[1/R \times (8 \times (\text{LENGTH} + FCS) + 6)]$$

The function Ceiling (•) is a function that returns the smallest integer value greater than or equal to its argument value. The appended bits ("pad bits") are set to "zeros" and are subsequently scrambled with the rest of the bits in the MAC frame payload.

Bit Interleaving

The coded bit stream is interleaved prior to modulation. Bit interleaving provides robustness against burst errors. The bit interleaving operation is performed in two stages: symbol interleaving followed by tone interleaving. The symbol interleaver permutes the bits across OFDM symbols to exploit frequency diversity across the sub-bands, while the tone interleaver permutes the bits across the data tones within an OFDM symbol to exploit frequency diversity across tones and provide robustness against narrow-band interferers. The symbol interleaver described herein is constrained to interleave among at most three consecutive OFDM symbols. This corresponds to a maximum interleaving latency of slightly less than 1 µs.

Let $N_{CBPS}$, for example, be the number of coded bits per OFDM symbol. First, the coded bits are grouped together into blocks of 3 $N_{CBPS}$ coded bits, which corresponds to three OFDM symbols. Each group of coded bits is then permuted using a regular symbol block interleaver of size $N_{CBPS} \times 3$. Now let the sequences $\{U(i)\}$ and $\{S(j)\}$, where $i, j=0, \ldots, 3N_{CBPS-1}$, represent the input and output bits of the symbol block interleaver, respectively. The input-output relationship of this interleaver is given by:

$$S(j) = U\left\{\text{Floor}\left(\frac{i}{N_{CBPS}}\right) + 3\text{Mod}(i, N_{CBPS})\right\},$$

where the function Floor(•) returns the largest integer value less than or equal to its argument value and where the function Mod(•) returns the remainder after division of $N_{CBPS}$ by i. If the coded bits available at the input of the symbol block interleaver correspond to less than three OFDM symbols, then the symbol interleaving operation is not performed on these bits. This condition is expected to occur towards the end of the packet, when the number of coded bits available to the symbol block interleaver only corresponds to that of 1 or 2 OFDM symbols.

The output of the symbol block interleaver is then passed through a tone block interleaver. The outputs of the symbol block interleaver are grouped together into blocks of $N_{CBPS}$ bits and then permuted using a regular block interleaver of size $N_{Tint} \times 10$, where $N_{Tint} = N_{CBPS}/10$. Now, let the sequences $\{S(i)\}$ and $\{V(j)\}$, where $i, j=0, \ldots, N_{CBPS}-1$, represent the input and output bits of the tone interleaver, respectively. The input-output relationship of the tone block interleaver is given by:

$$T(j) = S\left\{\text{Floor}\left(\frac{i}{N_{Tint}}\right) + 10\text{Mod}(i, N_{Tint})\right\},$$

where the function Mod(•) returns the remainder after division of $N_{Tint}$ by i.

Subcarrier Constellation Mapping

The OFDM subcarriers are modulated using either BPSK or QPSK modulation. The encoded and interleaved binary serial input data is divided into groups of 1 or 2 bits and converted into complex numbers representing BPSK or QPSK constellation points. The conversion is performed according to the Gray-coded constellation mappings 170a, 170b, illustrated in FIG. 17, with the input bit, $b_0$, being the earliest in the stream. The output values, d, are formed by multiplying the resulting (I+jQ) value by a normalization factor of $K_{MOD}$, as described in the following equation:

$$d = (I+jQ) \times K_{MOD}.$$

The normalization factor, $K_{MOD}$, depends on the base modulation mode, as prescribed in Table 9 below. Note that the modulation type can be different form the start to end of the transmission, as the signal changes from the channel estimation sequence to the MAC frame body. The purpose of the normalization factor is to achieve the same average power for all mappings. In practical implementations, an approximate value of the normalization factor can be used, as long as the device conforms to the modulation accuracy requirements.

For BPSK, $b_0$ determines the I value, as illustrated in Table 10 below. For QPSK, $b_0$ determines the I value and $b_1$ determines the Q value, as illustrated in Table 11 below.

TABLE 9

Modulation-dependent normalization factor

| Modulation | $K_{MOD}$ |
|---|---|
| BPSK | 1 |
| QPSK | $1/\sqrt{2}$ |

TABLE 10

BPSK encoding table

| Input bit ($b_0$) | I-out | Q-out |
|---|---|---|
| 0 | −1 | 0 |
| 1 | 1 | 0 |

TABLE 11

QPSK encoding table

| Input bit ($b_0 b_1$) | I-out | Q-out |
|---|---|---|
| 00 | −1 | −1 |
| 01 | −1 | 1 |
| 10 | 1 | −1 |
| 11 | I | 1 |

Pilot Subcarriers

There are two types of pilot signals defined for the OFDM PHY: standard pilot signals and user-defined pilot signals. The first set of pilot signals (standard pilot signals) must comply as described herein, while the specification of the second set of pilot signals (user-defined pilot signals) is left to the implementer.

In each OFDM symbol, eight of the subcarriers are dedicated to the standard pilot signals in order to make coherent detection robust against frequency offsets and phase noise. These standard pilot signals are put in subcarriers −55, −45, −35, −25, −15 −5, 5, 15, 25, 35, 45, and 55. The standard pilot signals are BPSK modulated by a pseudo binary sequence to prevent the generation of spectral lines. The contribution of the standard pilot subcarriers to each OFDM symbol is described further herein below.

The user-defined pilot signals are put in subcarriers −61, −60, . . . , −57, and 57, 58, . . . , 61. The user-defined pilot signals are BPSK modulated by the same pseudo binary sequence used to modulate the standard pilot signals.

OFDM Modulation

For information data rates of 55 and 80 Mb/s, the stream of complex numbers is divided into groups of 25 complex numbers. These complex numbers, $c_{n,k}$, which corresponds to subcarrier n of OFDM symbol k, are herein after denoted as follows:

$$c_{n,k} = c_{(n+25),k} = d_{n+25 \times k}\ n=0, 1, \ldots, 24;\ k=0, 1, \ldots, N_{SYM}-1$$

$$c_{(n+50),k} = c_{(n+75),k} = d_{(24-n)+25 \times k}^*$$

where $N_{SYM}$ denotes the number of OFDM symbols in the MAC frame body, tail bits, and pad bits.

For information data rates of 110, 160, and 200 Mb/s, the stream of complex numbers is divided into groups of 50 complex numbers. These complex numbers, $c_{n,k}$, which correspond to subcarrier n of OFDM symbol k, are herein after denoted as follows:

$$c_{n,k} = c_{(n+50) \times k}\ n=0, 1, \ldots, 49;\ k=0, 1 \ldots, N_{SYM}-1$$

$$c_{(n+50),k} = d_{(49-n)+50 \times k}^*$$

where $N_{SYM}$ denotes the number of OFDM symbols in the MAC frame body, tail bits, and pad bits.

For information data rates of 320 and 480 Mb/s, the stream of complex numbers is divided into groups of 100 complex numbers. These complex numbers, $c_{n,k}$, which correspond to subcarrier n of OFDM symbol k, are herein after denoted as follows:

$$c_{n,k} = d_{n+100 \times k}\ n=0, 1 \ldots, 99;\ k=0, 1 \ldots, N_{SYM}-1$$

where $N_{SYM}$ denotes the number of OFDM symbols in the MAC frame body, tail bits, and pad bits.

An OFDM symbol $r_{data,k}(t)$ is defined as $$r_{data,k}(t) = \sum_{n=0}^{N_{SD}} c_{n,k} \exp(j2\pi M(k)\Delta_F(t - T_{CP})) +$$

-continued $$p_k \sum_{n=-\frac{N_{ST}}{2}}^{\frac{N_{ST}}{2}} P_n \exp(j2\pi k \Delta_F)(t - T_{CP})),$$

where $N_{SD}$ is the number of data subcarriers, and $N_{ST}$ is the number of total subcarriers used, and where the function M(k) defines a mapping from the indices 0 to 99 to the logical frequency offset indices −56 to 56, excluding the locations reserved for the pilot subcarriers and the DC subcarrier:

$$M(k) = \begin{cases} k-56 & k=0 \\ k-55 & 1 \leq k \leq 9 \\ k-54 & 10 \leq k \leq 18 \\ k-53 & 19 \leq k \leq 27 \\ k-52 & 28 \leq k \leq 36 \\ k-51 & 37 \leq k \leq 45 \\ k-50 & 46 \leq k \leq 49 \\ k-49 & 50 \leq k \leq 53 \\ k-48 & 54 \leq k \leq 62 \\ k-47 & 63 \leq k \leq 71 \\ k-46 & 72 \leq k \leq 80 \\ k-45 & 81 \leq k \leq 89 \\ k-44 & 90 \leq k \leq 98 \\ k-43 & k=99 \end{cases}$$

The contribution due to the standard pilot subcarriers for the $k^{th}$ OFDM symbol is given by the inverse Fourier Transform of the sequence P:

$$P(k) = \begin{cases} 1 & k = \pm 5, \pm 25 \\ -1 & k = \pm 15, \pm 35, \pm 45, \pm 55 \\ 0 & k = \pm 1, \ldots, \pm 4, \pm 6, \ldots, \pm 14, \pm 16, \ldots, \pm 24, \pm 36, \ldots, \pm 44, \pm 46, \ldots, \pm 54, \pm 56 \end{cases}$$

The polarity of the pilot subcarriers is controlled by the following pseudo random sequence, $p_n$:

$$P_{0,\ldots,126} = \{1, 1, 1, 1, -1, -1, -1, 1, -1, -1, -1, -1, 1, 1, -1, 1, -1, -1, 1, 1, -1,$$

$$1, 1, -1, 1, 1, 1, 1, 1, -1, 1, 1, 1, -1, 1, 1, -1, -1, 1, 1, 1, -1, 1, -1, -1, -1, 1, -1, 1,$$

$$-1, -1, 1, -1, -1, 1, 1, 1, 1, -1, -1, 1, 1, -1, -1, 1, -1, 1, -1, 1, 1, -1, -1, -1, 1, 1,$$

$$-1, -1, -1, -1, 1, -1, -1, 1, -1, 1, 1, 1, 1, -1, 1, -1, 1, -1, 1, -1, -1, -1, -1, -1, 1,$$

$$-1, 1, 1, -1, 1, -1, 1, 1, 1, -1, -1, 1, -1, -1, -1, 1, 1, 1, -1, -1, -1, -1, -1, -1, -1, -1\}$$

Only one element of this sequence is used for an OFDM symbol.

The subcarrier frequency allocation 180 is shown in FIG. 18. To avoid difficulties in DAC and ADC offsets and carrier feed-through in the RF system, the subcarrier falling at DC ($0^{th}$ subcarrier) is not used.

Operating Channel Frequencies

Operating Frequency Range

The PHY operates in the 3.1-10.6 GHz frequency as regulated in the United States by the Code of Federal Regulations, Title 47, Section 15, as well as in any other areas that the regulatory bodies have also allocated this band.

Channel Numbering

The relationship between center frequency and channel number is given by the following equation:

Channel center frequency=$2904+528 \times n_{ch}$(MHz)

where $n_{ch}$=1, 2, . . . , 14. This definition provides a unique numbering system for all channels that have a spacing of 528 MHz and lie within the band 3.1-10.6 GHz. In the present embodiments, only channels 1 through 3 are considered valid operating channels; the remaining channels are reserved for future growth. Table 12 summarizes the channel allocation.

TABLE 12

OFDM PHY channel allocation

| CHNL_ID | Center frequency |
|---|---|
| 1 | 3432 MHz |
| 2 | 3960 MHz |
| 3 | 4488 MHz |
| 4 | 5016 MHz |
| 5 | 5544 MHz |
| 6 | 6072 MHz |
| 7 | 6600 MHz |
| 8 | 7128 MHz |
| 9 | 7656 MHz |
| 10 | 8184 MHz |
| 11 | 8712 MHz |
| 12 | 9240 MHz |
| 13 | 9768 MHz |
| 14 | 10296 MHz |

PHY Layer Timing

The values for the PHY layer timing parameters are defined in Table 13 below.

TABLE 13

PHY layer timing parameters

| PHY Parameter | Value |
|---|---|
| pMIFSTime | 2 us |
| pSIFSTime | 10 us |
| pCCADetectTime | 4.6875 us |
| pChannelSwitchTime | 9.0 ns |

Interframe Spacing

A conformant implementation supports the interframe spacing parameters given in Table 14 below.

TABLE 14

Interframe spacing parameters

| 802.15.3 MAC Parameter | Corresponding PHY Parameter |
|---|---|
| MIFS | pMIFSTime |
| SIFS | pSIFSTime |
| pBackoffSlot | pSIFSTime + pCCADetectTime |
| BIFS | pSIFSTime + pCCADetectTime |
| RIFS | 2 * pSIFSTime + pCCADetectTime |

Receive-to-Transmit Turnaround Time

The RX-to-TX turnaround time is pSIFSTime. This turnaround time is measured at the air interface from the trailing edge of the last received OFDM symbol to the leading edge of the first transmitted OFDM symbol of the PLCP preamble for the next frame.

Transmit-to-Receive Turnaround Time

The TX-to-RX turnaround time is pSIFSTime. This turnaround time is measured at the air interface from the trailing edge of the last transmitted symbol until the receiver is ready to begin the reception of the next PHY frame.

Time Between Successive Transmissions

The time between uninterrupted successive transmissions by the same DEV is pMIFSTime. This time is measured at the air interface from the trailing edge of the last OFDM symbol transmitted to the leading edge of the first OFDM symbol of the PLCP preamble for the following frame.

Channel Switch Time

The channel switch time is defined as the interval from when the trailing edge of the last valid OFDM symbol is on air until the PHY is ready to transmit or receive from the air another OFDM symbol on a new channel. The channel switch time does not exceed pChannelSwitchTime.

Header Check Sequence

The combined PLCP and MAC headers are protected with a CCITT CRC-16 header check sequence (HCS). The PHY parameter, pLengthHCS is 2 for this PHY. The CCITT CRC-16 HCS is the ones complement of the remainder generated by the modulo-2 division of the protected combined PLCP and MAC headers by the polynomial: $x^{16}+x^{12}+x^{5}+1$. The protected bits are processed in the transmit order. All HCS calculations are made prior to data scrambling. A schematic of the processing order 190 is shown in FIG. 19. The CRC-16 described herein above is the same one disclosed in the IEEE 802.15.3 draft standard.

Transmitter Specifications

Transmit PSD Mask

The transmitted spectrum has a 0 dBr (dB relative to the maximum spectral density of the signal) bandwidth not exceeding 260 MHz, −12 dBr at 285 MHz frequency offset, and −20 dBr at 330 MHz frequency offset and above. The transmitted spectral density of the transmitted signal mask 202 falls within the spectral density mask 200, as shown in FIG. 20.

Transmit Center Frequency Tolerance

The transmitted center frequency tolerance is ±20 ppm maximum.

Symbol Clock Frequency Tolerance

The symbol clock frequency tolerance is ±20 ppm maximum.

Clock Synchronization

The transmit center frequency and the symbol clock frequency are derived from the same reference oscillator.

Receiver Specifications

Receiver Sensitivity

For a packet error rate (PER) of less than 8% with a PSDU of 1024 bytes, the minimum receiver sensitivity numbers for the various rates are listed in Table 15 below.

TABLE 15

Receiver performance requirements

| Data rate (Mb/s) | Minimum sensitivity (dBm) |
|---|---|
| 55 | −83.0 |
| 80 | −81.2 |
| 110 | −80.0 |
| 160 | −78.2 |
| 200 | −76.7 |
| 320 | −75.1 |
| 480* | −72.7 |

Receiver CCA Performance

The start of a valid OFDM transmission at a receiver level equal to or greater than the minimum 55 Mb/s sensitivity (−83 dBm) causes CCA to indicate busy with a probability >90% within 4.6875 μs. If the preamble portion was missed, the receiver holds the carrier sense (CS) signal busy for any signal 20 dB above the minimum 55 Mb/s sensitivity (−63 dBm).

Signal Robustness

Interference and Susceptibility

In one embodiment, the receiver consists of a front-end pre-select filter to reject out-of band noise and interference. For the three-band TFI-OFDM system described herein, the pass-band of the pre-select filter is between 3168 MHz to 4752 MHz. The output of the pre-select filter is amplified using an LNA and is followed by down-conversion to the base-band using the appropriate center frequency. The base-band signal is filtered using a $3^{rd}$ order low-pass filter.

The UWB system described herein is assumed to be operating at 6 dB above the receiver sensitivity, namely $P_d=-74$ dBm (see Table 24 below), for an information data rate of 110 Mbps. Based on the link budget table set forth herein below, the average noise power per bit is −87 dBm. Since, a margin of 6 dB is available, the sum of the interferer-and-noise power can be at most −81 dBm to maintain a PER<8% for a 1024 byte packet. Under the assumption that the impact of the interferer is similar to that of additive noise, this corresponds to a maximum tolerable interferer power of −82.3 dBm at the input of the decoder. The interference and susceptibility analysis for the following types of interferers has been provided in Table 16:

Microwave oven
IEEE 802.15.1 (Bluetooth)
IEEE 802.11b
IEEE 802.15.3
IEEE 802.1a
IEEE 802.15.4

TABLE 16

Interference and Susceptibility Analysis

| | Microwave Oven | Bluetooth & IEEE 802.15.1 | IEEE 802.11b & IEEE 802.15.3 Interferer | IEEE 802.11a Interferer | IEEE 802.15.4 Interferer (2.45 GHz) |
|---|---|---|---|---|---|
| Max. tolerable interferer power at the encoder | −82.3 dBm | −82.3 dBm | −82.3 dBm | −82.3 dBm | −82.3 dBm |
| Processing gain (coding rate of 11/32) | 4.6 dB | 4.6 dB | 4.6 dB | 4.6 dB | 4.6 dB |
| Minimum base-band filter attenuation | 35.4 dB | 36.9 dB | 36.9 dB | 30.7 dB | 35.6 dB |
| Front-end pre-select fiter attenuation | 35 dB | 35 dB | 35 dB | 30 dB | 35 dB |
| Max. tolerable interferer power at the antenna | −7.3 dB | −5.8 dB | −5.8 dB | −17 dB | −7.1 dB |
| Interferer power at 1 m separation | −23.2 dBm | −40 dBm | −20 dBm | −31.9 dBm | −40.2 dBm |
| Minimum margin | 15.9 dB | 34.2 dB | 14.2 dB | 14.1 dB | 33.1 dB |
| Tolerable separation | <0.16 m | <0.02 m | <0.2 m | <0.2 m | <0.02 m |

Microwave Oven

The microwave oven is an out-of-band interferer; and based on the analysis presented in Table 16, the TFI-OFDM system can tolerate this interferer at a minimum separation of 0.16 m.

Bluetooth and IEEE 802.15.1 Interferer

This is an out-of-band interferer; and based on the analysis presented in Table 16, the TFI-OFDM system can tolerate this interferer at a minimum separation of 0.02 m.

IEEE 802.11b and IEEE 802.15.3 Interferer

This is an out-of-band interferer; and based on the analysis presented in Table 16, the TFI-OFDM system can tolerate this interferer at a minimum separation of 0.2 m. This interference tolerance is superior to the desired criteria of 0.3 m separation between the IEEE 802.11b interferer and the UWB reference device.

IEEE 802.11a Interferer

As the TFI-OFDM system only utilizes the spectrum between 3168 MHz and 4752 MHz, the IEEE 802.11a interferer is an out-of-band interferer. Hence, it is easier to design the front-end pre-select filter to reject the 802.11a interference. Based on the analysis presented in Table 16, the TFI-OFDM system can tolerate this interferer at a minimum separation of at least 0.2 m. This interference tolerance is superior to the desired criteria of 0.3 m separation between the IEEE 802.11a interferer and the UWB reference device.

IEEE 802.15.4 Interferer

This is an out-of-band interferer, and the TFI-OFDM system can tolerate this interferer at a minimum separation of 0.02 m. The analysis presented in Table 16 is only for the IEEE 802.15.4 interferer centered around 2.45 GHz. Although, the 802.15.4 device centered around 868 MHz and 915 MHz can have a receive power that is approximately 9 dB higher than that of the 802.15.4 device centered around 2.45 GHz, the base-band filter attenuation for these frequencies is significantly higher; and hence the 802.15.4 device with a center frequency of 2.45 GHz is the worst-case interferer.

Generic In-Band Modulated Interferer

The robustness of the TFI-OFDM system to the presence of a generic in-band modulated interferer was evaluated based on simulations. Since the symbol rate of the modulated interferer is only 5 MHz, it will interfere with only a couple of tones. The affected tones can be erased to combat the narrow-band interferer and erasure of these tones results in some performance degradation. One of the advantages of the TFI-OFDM system is that the sub-band in which the narrow band interferer is present can still be used with minimal impact. When operating at 6 dB above sensitivity, it was observed that for the worst case location of the interferer center frequency, the TFI-OFDM system can tolerate a generic in-band modulated interferer with a power of $P_1 > P_d - 3.8$ dB.

Generic In-Band Tone Interferer

The robustness of the TFI-OFDM system to the presence of a generic in-band tone interferer was evaluated based on simulations. A generic in-band tone interferer will affect at most two tones in any OFDM symbol. The affected tones can be erased to combat the narrow-band interferer and erasure of these tones results in some performance degradation. Hence, the sub-band in which the narrow band interferer is present can still be used with minimal impact. When operating at 6 dB above sensitivity, it was observed that for the worst case location of the interferer center frequency, the TFI-OFDM system can tolerate a generic in-band tone interferer with a power of $P_1 > P_d - 4.8$ dB.

Out-of-Band Interference from Intentional and Unintentional Radiators

The minimum out-of-band rejection (in dB) provided by the TFI-OFDM is listed in Table 17 below for various center frequencies.

TABLE 17

Minimum out-of-band rejection for TFI-OFDM

| Center | Pre-select Filter | Base-band Filter | Total |
|---|---|---|---|
| 900 MHz | 35 dB | 60 dB | 95 dB |
| 1900 MHz | 35 dB | 47 dB | 82 dB |
| 2450 MHz | 35 dB | 35 dB | 70 dB |
| 5150 MHz | 25 dB | 25 dB | 50 dB |
| 5300 MHz | 30 dB | 30 dB | 60 dB |
| 5850 MHz | 35 dB | 44 dB | 79 dB |

Coexistence

The TFI-OFDM system is very coexistence friendly. Firstly, for the system employing three sub-bands, all the victim receivers specified in the selection criteria set forth herein are essentially out-of-band. Hence, the impact of the TFI-OFDM system on these devices will be minimal, if any. Secondly, the TFI-OFDM system offers an enhanced level of co-existence with both existing and future narrow-band systems that occupy the same spectrum. Co-existence with in-band systems can be achieved by dynamically turning ON/OFF tones.

Out-of-band mask requirements on the TFI-OFDM system described herein below are computed based on the IEEE 802.11a and IEEE 802.11b victim receivers.

IEEE 802.11a Interferer

The IEEE 802.11a receiver has a minimum receiver sensitivity of −82 dBm and a signal bandwidth of 20 MHz. For the average interfering power of the UWB device to be at least 6 dB less than the minimum sensitivity level of the victim receiver, at a distance separation of 0.3 m, the transmit power of the UWB device in the bandwidth of interest should be less than −51.5 dBm or equivalently −64.5 dBm/MHz. This corresponds to an out-of-band rejection mask of at least 23 dB at a frequency of 5.3 GHz. This level of out-of-band rejection can be easily achieved at the transmitter by using the front-end pre-select filter.

IEEE 802.11b Interferer

The IEEE 802.11b receiver has a minimum receiver sensitivity of −76 dBm and a signal bandwidth of 11 MHz. For the average interfering power of the UWB device to be at least 6 dB less than the minimum sensitivity level of the victim receiver, at a distance separation of 0.3 m, the transmit power of the UWB device in the bandwidth of interest should be less than −52.4 dBm or equivalently −62.8 dBm/MHz. This corresponds to an out-of-band rejection mask of at least 22 dB at a frequency of 2.4 GHz. This level of out-of-band rejection can be easily achieved at the transmitter by using the front-end pre-select filter.

Regulatory Impact

The PHY embodiments described herein comply with the rules specified in the United States Code of Federal Regulations, Title 47, Section 15, Parts 15.517, 15.519, and 15.521. The scheme will also comply in regions that adopt the ruling specified by the FCC. Currently, there are no standardized regulations for UWB technologies in Europe, Japan, and Korea. However, regulatory efforts are underway in these regions. Due to the flexibility of the scheme described herein, it will comply with most regulatory standards.

Scalability

The PHY system was found to demonstrate scalability of the following parameters:

1. Power Consumption: The power consumption scales monotonically with information data rate. The power consumption values are listed as a function of the information data rates in Table 25 herein below.

2. Payload Bit Rate and Throughput: Several payload bit rates have been specified for the TFI-OFDM system in Table 3 above. Additional payload bit rates can be incorporated in the system by defining new spreading/coding rates. New coding rates can be obtained by puncturing the rate 1/3 mother code and defining new puncturing patterns.

3. Channelization: Fourteen non-overlapping physical channels have been defined for the TFI-OFDM system in Table 12 above. In one system, for example, three channels may be used and more channels can be added as the RF technology improves.

4. Complexity: The system complexity monotonically scales with the information data rate.

5. Range: The range of the TFI-OFDM system is a function of the data rate of operation and is tabulated in Table 23 below for the information data rates of 110 Mb/s, 200 Mb/s and 480 Mb/s.

6. Frequencies of operation: The system can easily scale the frequencies of operation by adding or turning off some of the sub-bands.

7. Occupied bandwidth: The occupied bandwidth of the system can be easily modified by dynamically turning on/off tones.

8. Technology: The TFI-OFDM system has a comparable complexity between the analog and digital sections. The die size, power consumption and speed of operation of the digital section will scale with technology (Moore's law).

Location Awareness

The TFI-OFDM system has the capability to determine the relative location of one device with respect to another. The relative location information can be obtained by estimating the round trip delay between the devices. As the bandwidth of each sub-band in the TFI-OFDM system is 528 MHz, the minimum resolvability between the multi-path fingers is 1.9 ns. Hence, the minimum level of accuracy that can be obtained for the location awareness is 57 cm.

Alternate PHY Required MAC Enhancements and Modifications

Certain enhancements to the MAC are necessary to support the PHY. The PHY specification defines certain interleaving sequences (IS) each of which is a repetition of an ordered group of channel indexes 210 such as seen in FIG. 21. Each IS is designated by a unique IS number. Given an IS, the OFDM symbols of a PLCP frame, which starts with a PLCP preamble, are transmitted successively on each of the ordered channels, beginning from the first one, as defined for that IS.

A predetermined IS, as specified by the PHY, is used in transmitting each beacon frame. This facilitates the reception of beacon frames by DEVs, and hence the synchronization of unassociated DEVs, or resynchronization of associated DEVs that have lost the synchronization, with a given PNC.

The PHY further defines certain rotation sequences (RS) each of which is a repetition of an ordered group of IS numbers 220 such as seen in FIG. 22. Each RS is designated by a unique RS number. In any piconet, DEVs employ the ordered ISs defined for a specific RS to transmit their non-beacon frames in successive superframes, with a specific IS corresponding to a specific superframe. Different piconets should choose different RSs for the use by their respective DEVs.

The introduction of RSs further randomizes the subchannels used among, and hence reduces the interference from, overlapping piconets. With CSMA/CA used as the access method in the CAP, DEVs in overlapping piconets tend to synchronize the start of their frame transmissions, thereby resulting in repetitive collisions if a fixed IS were used for all transmissions in any piconet.

In view of the foregoing, the MAC enhancements described herein below specify the mechanisms that enable the MAC entity of any DEV in a given piconet to choose the appropriate interleaving sequence for its non-beacon frame transmissions, and to communicate the chosen interleaving sequence to the PHY entity within the same DEV.

Frame Format Enhancement for Time-Frequency Interleaving

Time-Frequency Interleaving Information Element

Figure 23:
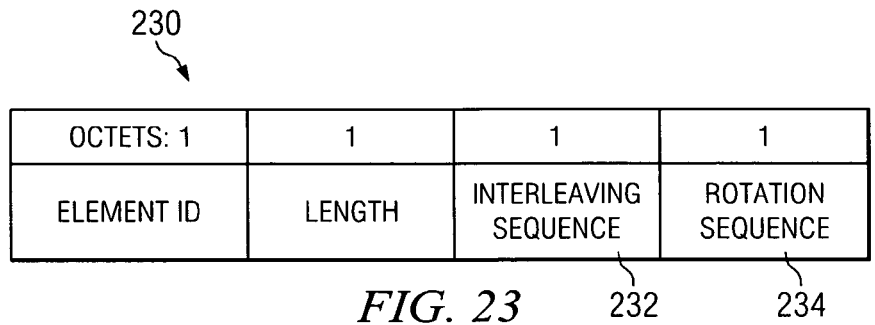
FIG. 23 illustrates a time-frequency frequency information element format according to one embodiment.

The time-frequency interleaving (TFI) information element (IE) contains a set of parameters necessary to allow synchronization for DEVs using the PHY. The IE Payload field 230 contains Interleaving Sequence (IS) 232 and Rotation Sequence (RS) 234 parameters such as seen in FIG. 23.

The Interleaving Sequence field 232 is 1 octet in length and specifies the current interleaving sequence (PHYPIB_CurrentIS) of channel indexes within a set of interleaving sequences.

The Rotation Sequence field 234 is 1 octet in length and specifies the current rotation sequence (PHYPIB_CurrentRS) of interleaving sequences within a set of rotation sequences.

The PNC updates the IS field 232 in each beacon according to the RS field 234, changing one IS Number to the next in the order as defined for that RS. The PNC maintains the same RS Number in successive beacons, thus allowing the DEVs' missing beacons to determine the interleaving sequences used for the corresponding superframes. The PNC may change the RS parameter by applying the piconet parameter change procedure as defined in the IEEE 802.15.3-2003 Standard. The interleaving sequence 232 starts with the first IS that appears in the new RS 234 once the piconet parameter change takes effect. Those skilled in the art will appreciate that other fields may be added to this IE Payload in future MAC enhancements.

Piconet Parameter Change Information Element

The New Channel Index field in the Piconet Parameter Changer information element is herein after renamed as "New Channel Index/RS Number". For DEVs using the PHY, when the Change Type field in this information element is set to 4, the Interpretation becomes "RS Number" (instead of "Channel" as currently defined); the Field to Decode becomes "New Channel Index/RS Number"; and the Description of Field Contents reads "The new RS Number that will take effect after the beacon with the Change Counter field equal to zero is sent."

Beacon Frame

A TFI IE immediately follows the CTA IE(s) in the beacon and is included in each beacon frame of a piconet using the PHY.

Management Enhancements for Time-Frequency Interleaving TFI PHY PIB

The following is added to the table for TFI PHY attributes.

| Attribute | Length | Definition | Type |
|---|---|---|---|
| | TFI PHY attributes (new) | | |
| PHYPIB_CurrentIS | 1 octet | The interleaving sequence to be used by this DEV for the current superframe | Dynamic |
| PHYPIB_CurrentRS | 1 octet | The rotation sequence to be used by this DEV in determining interleaving sequences for subsequent superframes | Dynamic |

The values of these attributes are updated by means of the PLME-SET.request and PLME-SET.confirm primitives as defined in Clause 6 of IEEE 802.15.3-2003 standard.

The PLME-SET.request contains two parameters, PHYPIB_Attribute and PHYPIB_Value, and is issued by the MLME to the PLME to set the PHYPIB_Attribute to PHYPIB_Value. For the above two attributes, this primitive is issued upon receiving a valid beacon or missing an expected beacon.

The PLME-SET.confirm contains two parameters, ResultCode and PHYPIB_Attribute, and is issued by the PLME to the MLME in response to a PLME-SET.request. The ResultCode indicates the result of setting the PHYPIB_Attribute to the requested value.

PHY Layer Criteria

PHY-SAY Payload Bit Rate and Data Throughput

Payload Bit Rate

The UWB PHY supports information data rates of 55, 80, 110, 200, 320, and 480 Mb/s. The support of transmitting and receiving data rates of 55, 110, and 200 Mb/s are mandatory. The support for the remaining data rates of 80, 160, 320, and 480 Mb/s are optional.

Packet Overhead

The initial preamble is comprised of 30 OFDM symbols, where the duration of each OFDM symbol is 312.5 ns. Thus, the initial preamble has a length of 9.375 us. Note that this value is independent of information data rate. The PLCP header, MAC header, HCS, and tail bits corresponds to 120 information bits. After encoding and puncturing, this corresponds to exactly 350 coded bits. Since, the PLCP header, MAC header, HCS, and tail bits are sent at an information data rate of 55 Mbps, these coded bits correspond to exactly 7 OFDM symbols. Thus, the PLCP header, MAC header, HCS, and tail bits have a total length of 2.1875 µs. Again, this time is independent of information data rate since it is always encoded at 55 Mbps.

Since the MPDU will be encoded at the information data rate, the length in time for the MPDU will vary according to the data rate. Using the equation defined herein before in association with pad bits, one can determine the number of OFDM symbols that will be needed to transmit an MPDU+FCS of 1024 octets. Since the time for each OFDM symbol is 312.5 ns, one can easily determine the time required for 1024 octet data packets.

Table 18 below summarizes the length in time for each component of the packet as a function of information data rate.

TABLE 18

| Time | Length at 55 Mb/s | Length at 80 Mb/s | Length at 110 Mb/s | Length at 160 Mb/s | Length at 200 Mb/s | Length at 320 Mb/s | Length at 480 Mb/s |
|---|---|---|---|---|---|---|---|
| | Time duration of each component of the packet versus data rate | | | | | | |
| T_PA_INIT | 9.375 µS | 9.375 µS | 9.375 µS | 9.375 µS | 9.375 µS | 9.375 µS | 9.375 µS |
| T_PHYHDR + T_MACHDR + T_HCS + T_TAILBITS | 2.1875 µS | 2.1875 µS | 2.1875 µS | 2.1875 µS | 2.1875 µS | 2.1875 MS | 2.1875 µS |
| T_DATA | 149.0625 µS | 102.5 µS | 74.6875 µS | 51.25 µS | 41.25 µS | 25.625 µS | 17.1875 µS |
| T_MIFS | 2 µS | 2 µS | 2 µS | 2 µS | 2 µS | 2 µS | 2 µS |
| T_PA_CONT | 4.6875 µS | 4.6875 µS | 4.6875 µS | 4.6875 µS | 4.6875 µS | 4.6875 µS | 4.6875 µS |
| T_SIFS | 10 µS | 10 µS | 10 µS | 10 µS | 10 µS | 10 µS | 10 µS |
| T_RIFS | 24.6875 µS | 24.6875 µS | 24.6875 µS | 24.6875 µS | 24.6875 µS | 24.6875 µS | 24.6875 µS |
| T_BIFS | 14.6875 µS | 14.6875 µS | 14.6875 µS | 14.6875 µS | 14.6875 µS | 14.6875 µS | 14.6875 µS |

PHY-SAP Throughput

The throughput for a single frame and multiple frame (5 frames) transmission with an MPDU of 1024 bytes as a function of the information data rate is summarized in Table 19 below.

TABLE 19

Throughput for a 1024 byte MPDU versus data rate (single/multiple frames)

| #of frames | Throughput at 55 Mb/s | Throughput at 80 Mbps | Throughput at 110 Mbps | Throughput at 160 Mbps | Throughput at 200 Mbps | Throughput at 320 Mbps | Throughput at 480 Mbps |
|---|---|---|---|---|---|---|---|
| 1 | 48.01 Mb/s | 66.03 Mb/s | 85.11 Mb/s | 112.51 Mb/s | 130.42 Mb/s | 173.61 Mb/s | 211.41 Mb/s |
| 5 | 51.05 Mb/s | 71.91 Mb/s | 95.15 Mb/s | 130.73 Mb/s | 155.56 Mb/s | 221.18 Mb/s | 286.43 Mb/s |

The throughput for a single frame and multiple frame (5 frames) transmission with an MPDU of 4024 bytes as a function of the information data rate is summarized in Table 20 below.

TABLE 20

Throughput for a 4024 byte MPDU versus data rate (single/multiple frames)

| #of frames | Throughput at 55 Mb/s | Throughput at 80 Mbps | Throughput at 110 Mbps | Throughput at 160 Mbps | Throughput at 200 Mbps | Throughput at 320 Mbps | Throughput at 480 Mbps |
|---|---|---|---|---|---|---|---|
| 1 | 52.97 Mb/s | 75.84 Mb/s | 102.30 Mb/s | 144.34 Mb/s | 175.92 Mb/s | 263.20 Mb/s | 362.37 Mb/s |
| 5 | 53.87 Mb/s | 77.70 Mb/s | 105.71 Mb/s | 151.23 Mb/s | 186.26 Mb/s | 287.05 Mb/s | 409.16 Mb/s |

Simultaneously Operating Piconets

The multiple piconet capability of the TFI-OFDM system was evaluated by the present inventors, based on simulations, in the presence of un-coordinated piconets. The performance simulations incorporated losses due to front-end filtering, ADC degradation, multi-path, shadowing, packet acquisition, channel estimation, clock frequency mismatch, carrier offset recovery, carrier tracking, etc. In order to avoid any unfair bias in the simulation experiment, the channel realizations for the test link as well as the reference links were chosen to have an in-band energy close to 0 dB ($\pm 0.3$ dB). Table 21 below lists the channel realizations used for the test link and the interfering link as a function of the channel environment.

TABLE 21

Channel realizations used in the simultaneously operating piconet test

| Channel Environment | Test Link | Interfering Link |
|---|---|---|
| CM1 | 10, 19, 20, 42, 43, 49, 52, 63, 86, 100 | 54 |
| CM2 | 1, 21, 31, 41, 42, 45, 46, 56, 84, 98 | N/A |
| CM3 | 12, 27, 38, 52, 55, 62, 77, 82, 98, 100 | 83 |
| CM4 | 6, 17, 18, 19, 61, 62, 66, 68, 77, 80 | 33 |

Figure 24:
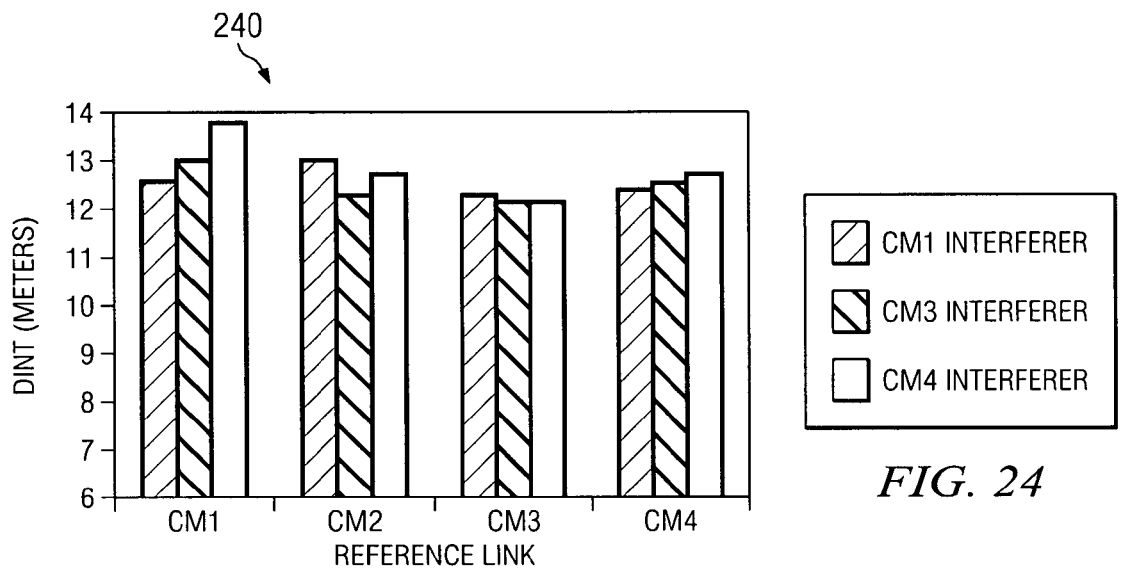
FIG. 24 illustrates single co-channel interference separation distance for a variety of reference multi-path channel environments and interfering channel environments.

For the single co-channel separation distance, the test link was established such that the received signal power was 6 dB above the minimum sensitivity level. For a data rate of 110 Mbps, this corresponds to a reference distance of $d_{ref}=9.55$ m. The distance separation at which a single co-channel interferer can be tolerated was obtained by averaging the performance over the 10 test link channel realizations for each channel environment. The distance separation 240 is illustrated in FIG. 24 for a variety of reference multi-path channel environments and interfering channel environments. The single co-channel interference separation was found to be not very dependent on the channel environment of either the test link or the interfering link.

Signal Acquisition

The standard PLCP preamble is designed specifically to be robust in low signal-to-noise environments. In fact, the standard PLCP preamble was designed to operate at 3 dB below sensitivity for an information data rate of 55 Mb/s. Table 22 below shows the false alarm and miss detect probabilities for an information data rate of 110 and 200 Mb/s. These probabilities are specified for a single piconet and various channel conditions (AWGN, CM1 through CM4). These results were averaged over 50,000 realizations (500 noise realizations for each of the 100 channel realizations) for a given multi-path channel environment. These results include an offset of $\pm 20$ ppm at both the transmitter and receiver clock synthesizer.

TABLE 22

False detect and miss detect probabilities for a single piconet

| Channel Environment | $P_m$ at 110 Mb/s | $P_m$ at 200 Mb/s | $P_f$ | Acquistion Time |
|---|---|---|---|---|
| AWGN | $<2 \times 10^{-5}$ | $<2 \times 10^{-5}$ | $7.2 \times 10^{-4}$ | $<4.69$ μs |
| CM1 | $<2 \times 10^{-5}$ | $<2 \times 10^{-5}$ | $7.2 \times 10^{-4}$ | $<4.69$ μs |
| CM2 | $<2 \times 10^{-5}$ | $<2 \times 10^{-5}$ | $7.2 \times 10^{-4}$ | $<4.69$ μs |
| CM3 | $<2 \times 10^{-5}$ | $<2 \times 10^{-5}$ | $7.2 \times 10^{-4}$ | $<4.69$ μs |
| CM4 | $<2 \times 10^{-5}$ | $<2 \times 10^{-5}$ | $7.2 \times 10^{-4}$ | $<4.69$ μs |

The probability of miss detection as a function of $Eb/N_0$ was demonstrated by the present inventors to show that the proposed preamble is robust in all multi-path channel environments, even for low $Eb/N_0$ values. Again, these results were averaged over 50,000 realizations (500 noise realizations for each of the 100 channel realizations) for a given multi-path channel environment.

Figure 25:
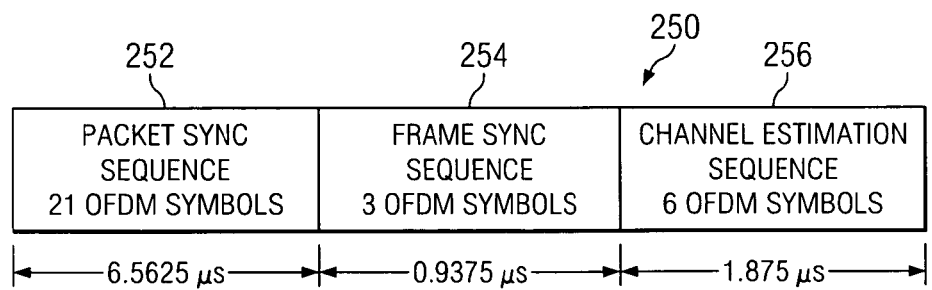
FIG. 25 is a timeline illustrating acquisition of a standard PLCP preamble.

A timeline 250 showing the overall acquisition process of the standard PLCP preamble is shown in FIG. 25. The first 6.5625 μs 252 are used for packet detection and acquisition, coarse frequency estimation, coarse symbol timing estimation, and AGC settling. The next 0.9375 μs 254 are used for synchronization within the preamble, i.e., to determine the location within the preamble, and to indicate the start of the channel estimation sequence. The final 1.875 μs 256 are used for channel estimation, fine frequency estimation, and fine symbol timing estimation.

System

Figure 26:
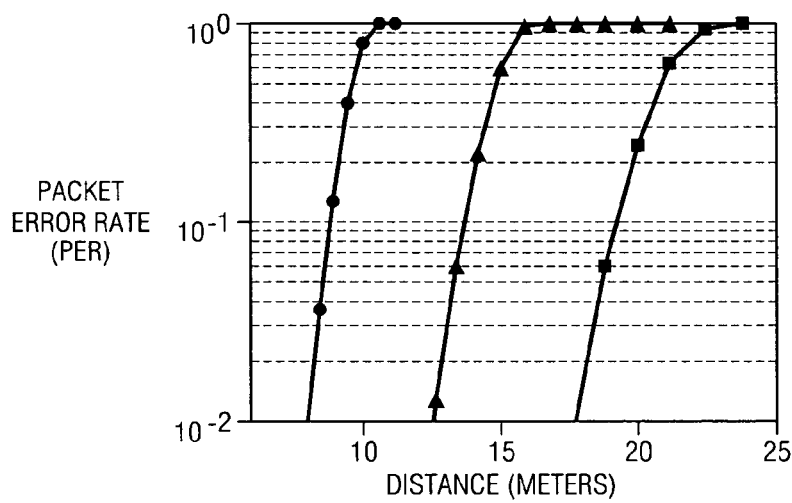
FIG. 26 is a plot illustrating PER as a function of distance and information data rate in an AWGN environment.
Figure 27:
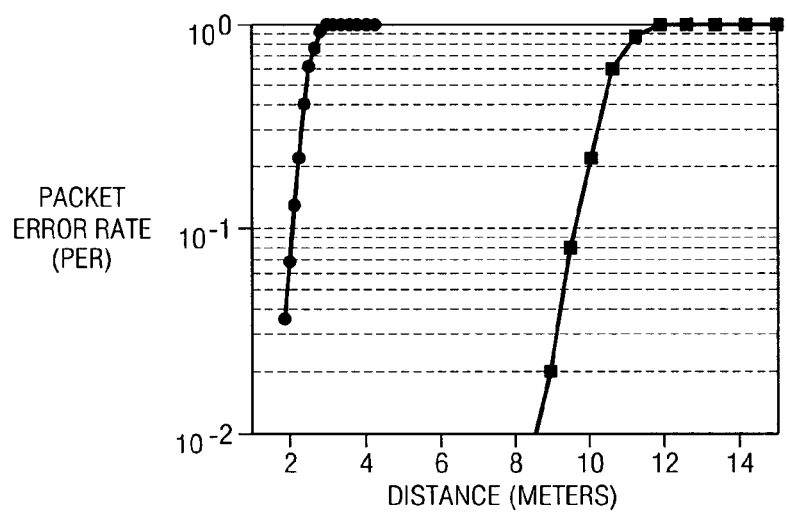
FIG. 27 is a plot illustrating PER as a function of distance and information data rate in a CM1 channel environment for the $90^{th}$% ile channel realization.
Figure 28:
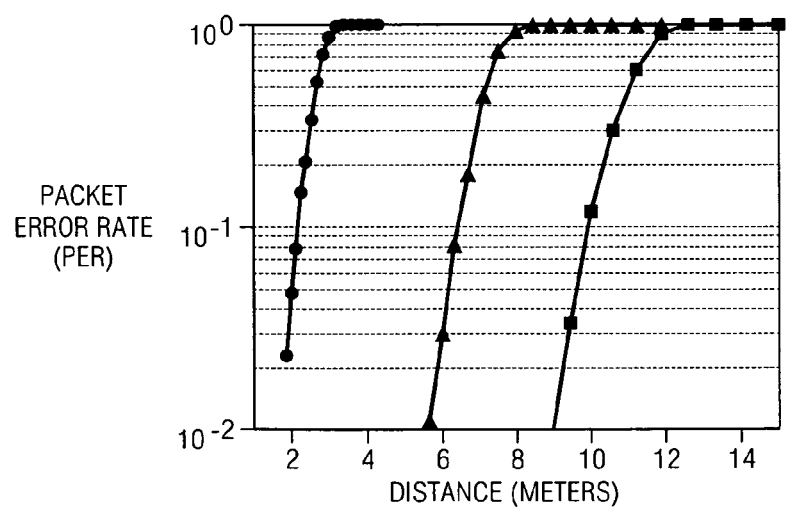
FIG. 28 is a plot illustrating PER as a function of distance and information data rate in a CM2 channel environment for the $90^{th}$% ile channel realization.
Figure 29:
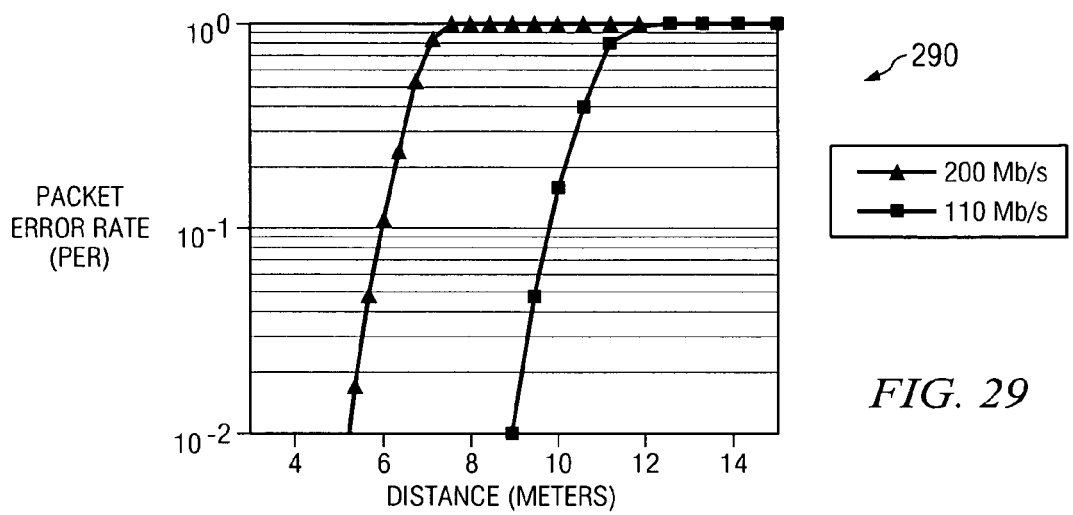
FIG. 29 is a plot illustrating PER as a function of distance and information data rate in a CM3 channel environment for the $90^{th}$% ile channel realization.
Figure 30:
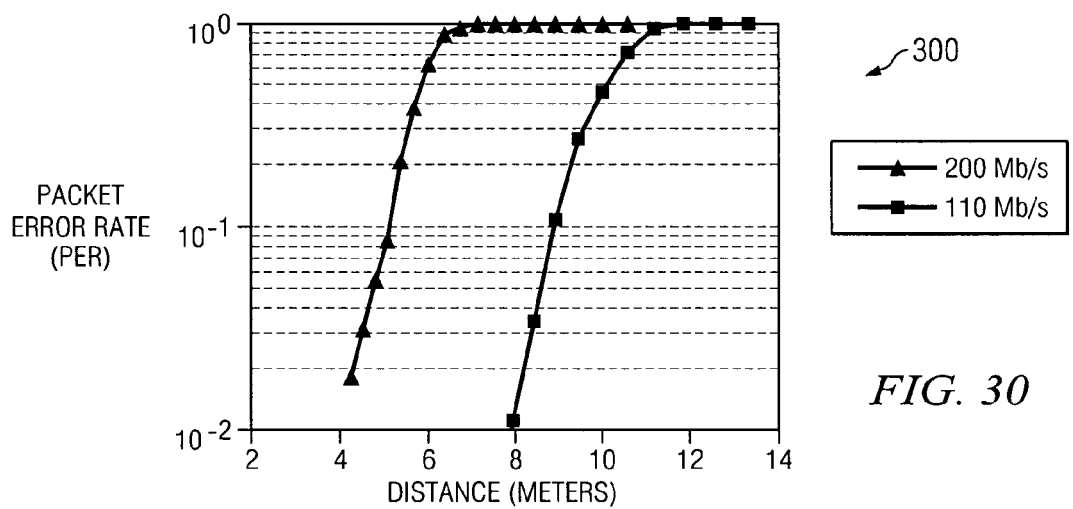
FIG. 30 is a plot illustrating PER as a function of distance and information data rate in a CM4 channel environment for the $90^{th}$% ile channel realization.

The performance of the TFI-OFDM system was evaluated in AWGN and multi-path channel environments specified by the IEEE 802.15.3a channel modeling sub-committee report. A path loss decay exponent of 2 was assumed for all the four channel environments and the "old" channel realizations from each of the environments have been used for these simulations. All simulations were performed with at least 200 packets (typically 1000) with a payload of 1 K bytes each. The performance simulations incorporated losses due to front-end filtering, ADC degradation, multi-path, shadowing, packet acquisition, channel estimation, clock frequency mismatch, carrier offset recovery, carrier tracking, etc. The PER performance 260 for an AWGN channel is shown in FIG. 26 as a function of distance and the information data rate.

The PER performance 270, 280, 290, 300 for the $90^{th}$% ile channel realization is illustrated in FIG. 27, FIG. 28, FIG. 29, and FIG. 30 as a function of distance for the four channel environments CM1-CM4, respectively. These plots correspond to the performance of the $90^{th}$ best channel realization, i.e., the worst 10% channels were discarded. This implies that the performance of the TFI-OFDM system is better than what is illustrated in these plots for at least 90% of the channel realizations from each channel environment.

The range at which the TFI-OFDM system can achieve a PER of 8% with a link success probability of 90% is listed in Table 23 below for AWGN and the multi-path channel environments. As the link success probability is dominated by shadowing and not by signal acquisition as shown in Table 22, the link success probability in AWGN channel environment, for the distance values listed in Table 23, is close to 100%. In an AWGN environment, the TFI-OFDM system easily satisfies the data rate versus range requirement of 110 Mbps at 10 m and 200 Mbps at 4 m. Furthermore, the TFI-OFDM system can support data rates of 200 Mbps and 480 Mbps at a distance of 5-6.3 m and 2 m, respectively, in various multi-path channel environments for a link success probability of 90%.

TABLE 23

| | Range to achieve a PER of 8% with a 90% link success probability. | | | | |
|---|---|---|---|---|---|
| Rate | AWGN | CM1 | CM2 | CM3 | CM4 |
| 110 Mb/s | 19.1 m | 9.5 m | 9.8 m | 9.7 m | 8.8 m |
| 200 Mb/s | 13.5 m | N/A | 6.3 m | 5.8 m | 5 m |
| 480 Mb/s | 8.7 m | 2 m | 2 m | N/A | N/A |

Figure 31:
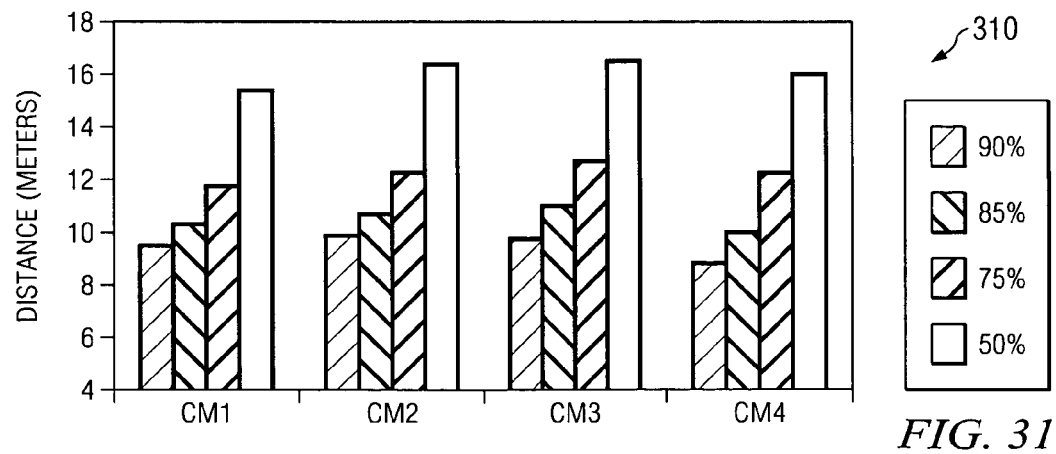
FIG. 31 is a graph illustrating range as a function of link success probability and channel environment for an information data rate of 110 Mbps.
Figure 32:
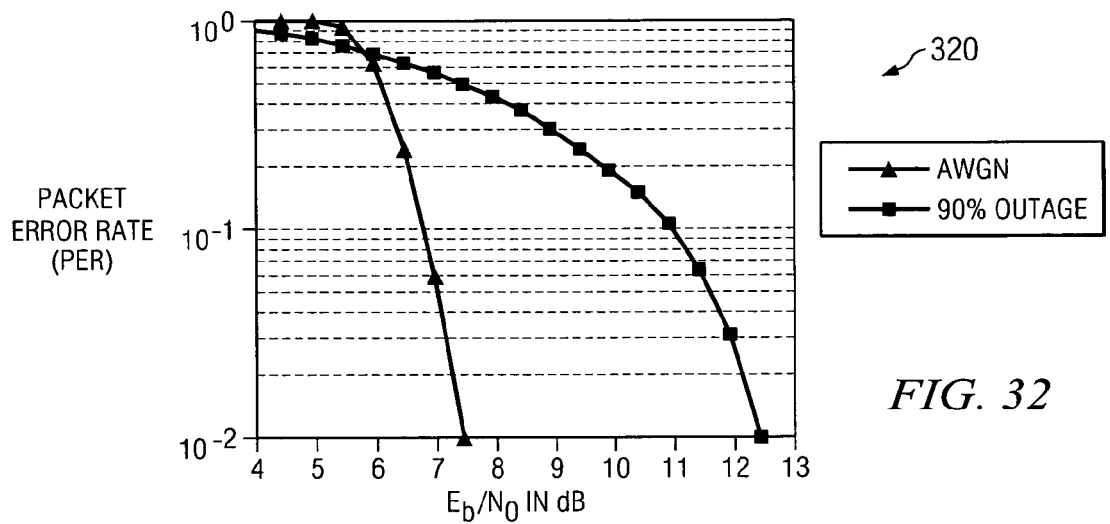
FIG. 32 is a plot illustrating 90% outage PER as a function of $E_b/N_0$ for a CM1 channel environment and an information data rate of 110 Mbps.
Figure 33:
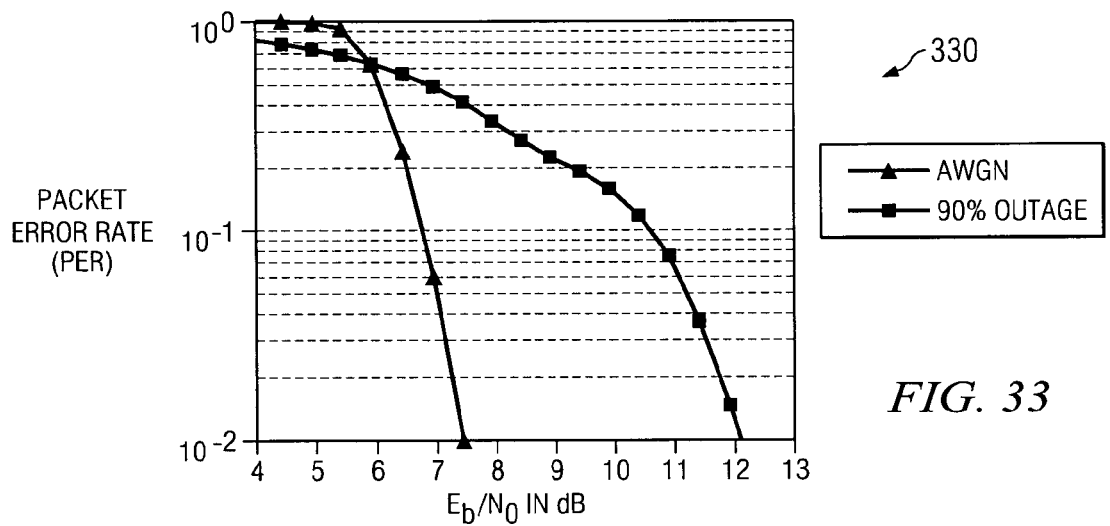
FIG. 33 is a plot illustrating 90% outage PER as a function of $E_b/N_0$ for a CM2 channel environment and an information data rate of 110 Mbps.
Figure 34:
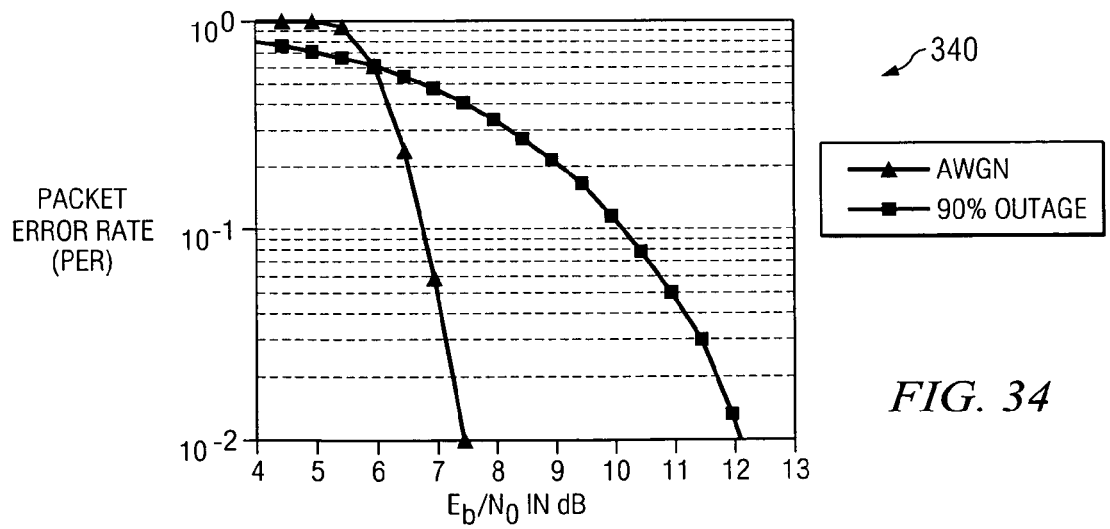
FIG. 34 is a plot illustrating 90% outage PER as a function of $E_b/N_0$ for a CM3 channel environment and an information data rate of 110 Mbps.
Figure 35:
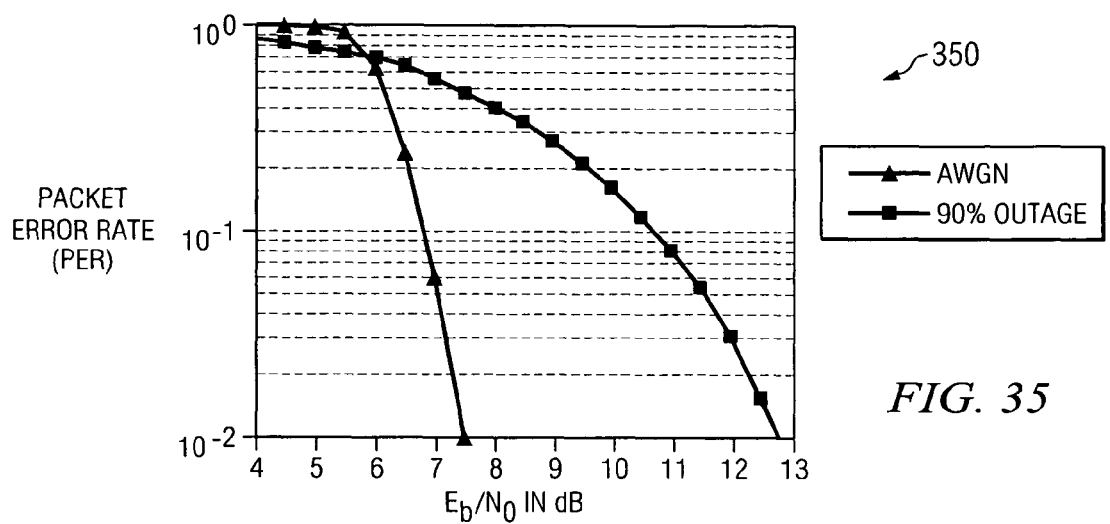
FIG. 35 is a plot illustrating 90% outage PER as a function of $E_b/N_0$ for a CM4 channel environment and an information data rate of 110 Mbps.

The probability of link success 310 for the four multi-path channel environments is illustrated in FIG. 31 as a function of distance for an information data rate of 110 Mbps. As the TFI-OFDM system has been designed to be robust to multi-path and with a sufficiently long cyclic prefix, the performance is similar in the four channel environments. The small variations in performance are primarily due to the effect of shadowing that has been incorporated in the 100 channel realizations corresponding to each of the four channel environments. From FIG. 31 one can see that the TFI-OFDM system can support a data rate of 110 Mbps at a distance of about 8.8-9.8 m with a link success probability of 90% and a distance of 10-11 m for a link success probability of 85%.

The plot of the 90% outage PER 320, 330, 340, 350 (defined as the average PER over the 90% best channels) as a function of $Eb/N_0$ is shown in FIG. 32, FIG. 33, FIG. 34, and FIG. 35 respectively for the four multi-path channel environments and the AWGN environment for an information data rate of 110 Mbps. For these plots, the value of $E_b$ was computed as the average multi-path signal energy, averaged over the 100 channel realizations for each environment.

| | A link budget according to one embodiment | | |
|---|---|---|---|
| Parameter | Value | Value | Value |
| Information data rate ($R_b$) | 110 Mb/s | 200 Mb/s | 480 Mb/s |
| Average Tx power ($P_T$) | −10.3 dBm | −10.3 dBm | −10.3 dBm |
| Tx antenna gain ($G_T$) | 0 dBi | 0 dBi | 0 dBi |
| $f_c = \sqrt{f_{min}f_{max}}$: geometric center frequency of waveform ($f_{min}$ and $f_{max}$ are the −10 dB edges of the waveform spectrum) | 3882 MHz | 3882 MHz | 3882 MHz |
| Path loss at 1 meter ($L_1 = 20 \log_{10}(4\pi f_c/c)$ c = 3 × $10^8$ m/s | 44.2 dB | 44.2 dB | 44.2 dB |
| Path loss at d m ($L_2 = 20 \log_{10}(d\lambda)$) | 20 dB (d = 10 meters) | 12 dB (d = 4 meters) | 6 dB (d = 2 meters) |
| Rx antenna gain ($G_R$) | 0 dBi | 0 dBi | 0 dBi |
| Rx power ($P_R = P_T + G_T + G_R − L_1 − L_2$ (dB)) | −74.5 dBm | −66.5 dBm | −60.5 dBm |
| Average noise power per bit (N = −174 + 10 * $\log_{10}(R_b)$) | −93.6 dBm | −91.0 dBm | −87.2 dBm |
| Rx Noise Figure Referred to the Antenna Terminal ($N_F$)[1] | 6.6 dB | 6.6 dB | 6.6 dB |
| Average noise power per bit ($P_N = N + N_F$) | −87.0 dBm | −84.4 dBm | −80.6 dBm |
| Required $Eb/N_0$ (S) | 4.0 dB | 4.7 dB | 4.9 dB |
| Implementation Loss[2] (I) | 3.0 dB | 3.0 dB | 3.0 dB |
| Link Margin (M = $P_R − P_N − S − I$) | 5.5 dB | 10.2 dB | 12.2 dB |
| Proposed Min. Rx Sensitivity Level[3] | −80.0 dBm | −76.7 dBm | −72.7 dBm |

The primary sources for the noise figure were the LNA and mixer. The voltage gain of the LNA is approximately 15 dB, while the voltage conversion gain of the mixer is approximately 10 dB. The total noise at the output of the LNA is $0.722\times10^{-16}$ $V^2$/Hz. This value includes the noise of the LNA and the input of resistor. The total noise at the output of the mixer is $0.722\times10^{-16}$ $V^2$/Hz+$(8\times10^{-9})2$ $V^2$/Hz=$0.786\times10^{-16}$ $V^2$/Hz, where the second term in the addition is generated by the noise sources within the mixer. Thus, the overall noise figure for the analog front-end is $10\log_{10}(7.86/2.56)$=4.9 dB. Including the losses associated with the pre-select filter (1.0 dB) and the transmit/receive switch (0.7 dB), the overall noise figure is 6.6 dB.

Sensitivity

For a packet error rate (PER) of less than 8% with a PSDU of 1024 bytes, the minimum receiver sensitivity numbers for the various rates are listed in Table 15 above.

TABLE 24

Receiver performance requirements

| Data rate (Mb/s) | Minimum sensitivity (dBm) |
|---|---|
| 55 | −83.0 |
| 80 | −81.2 |
| 110 | −80.0 |
| 160 | −78.2 |
| 200 | −76.7 |
| 320 | −75.1 |
| 480 | −72.7 |

Power Management Modes

The PHY system supports all of the power managements modes (ACTIVE, PSPS, SPS, and HIBERNATE) defined the IEEE 802.15.3 draft standard.

Power Consumption

The power consumption calculations assume a 90 nm CMOS technology node. In addition, a supply voltage of 1.5 V was assumed for the analog section of the PHY, except for the LNA where a 2 V supply was assumed. The digital section of the PHY requires a supply voltage of 1.2 V and a clock of 132 MHz. Using these assumptions, the power for transmit, receive, clear channel assessment, and power save were calculated; and the resulting power consumption values are listed in Table 25 below.

TABLE 25

| | Power consumption | | | |
|---|---|---|---|---|
| Rate (Mb/s) | Transmit | Receive | CCA | Power Save (Deep Sleep) |
| 110 | 93 mW | 142 mW | 92 mW | 15 μW |
| 200 | 93 mW | 156 mW | 92 mW | 15 μW |
| 480 | 145 mW | 198 mW | 92 mW | 15 μW |

Antenna Practicality

The antenna is assumed to have the following characteristics across the bandwidth of interest: frequency-independent gain and omni-directional patterns. The remaining requirements for the antenna can be relaxed because OFDM has an inherent robustness against gain, phase, and group delay variation that may be introduced by the antenna. A 16 mm×13.6 mm×3 mm antenna with similar characteristics is already commercially available at a low cost and can meet many of the form factors specified herein.

Figure 36:
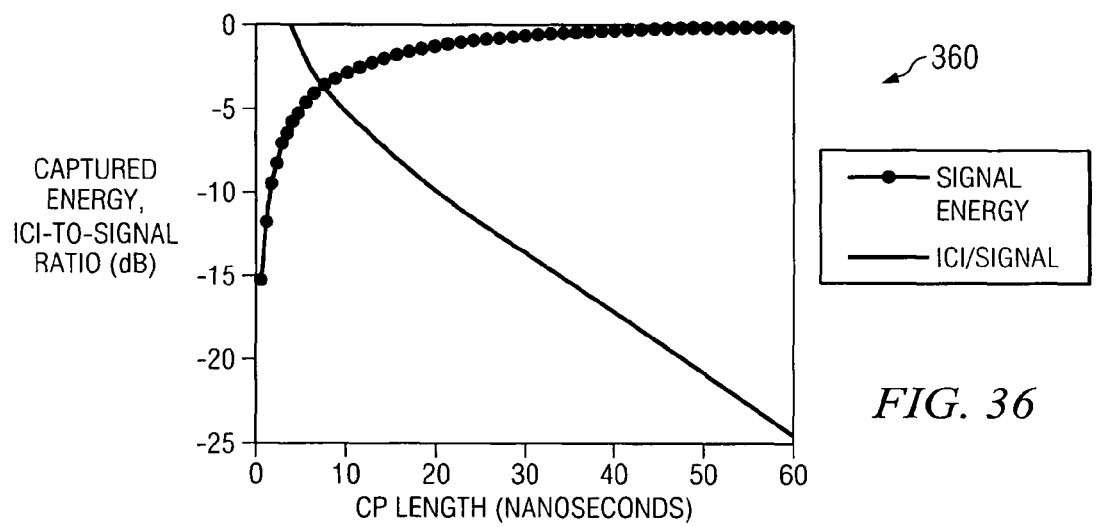
FIG. 36 is a plot illustrating captured multi-path energy as a function of cyclic prefix length for a CM3 channel environment.

Cyclic Prefix Length Peak-to-Average Ratio Requirement and FFT/IFFT Complexity for the TFI-OFDM System Cyclic Prefix Length One of the key design parameters in an OFDM system is the duration of the cyclic prefix (CP). This length should be chosen such that the overhead due to CP is small, while still minimizing the performance degradation due to loss in collected multi-path energy and the resulting inter-carrier-interference (ICI). To illustrate the impact of CP length on system performance, the average captured energy 360 for the CM3 channel environment, as well as the inter-carrier interference (ICI) introduced by the multi-path energy outside the cyclic prefix window, is plotted in FIG. 36. For a cyclic prefix length of 60 ns, the average loss in collected multi-path is less than 0.1 dB, while the ICI-to-Signal ratio is less than −24 dB. In this figure, the ICI-to-Signal ratio is shown at the input of the decoder and, hence, incorporates the processing gain that is expected for an information data rate of 110 Mbps. From the link budget analysis presented herein before, the required $Eb/N_0$ (including implementation losses), to achieve a PER of 8%, is only 7 dB. Hence, a choice of 60 ns for the cyclic prefix length is more than sufficient.

Peak-to-Average Ratio

Figure 37:
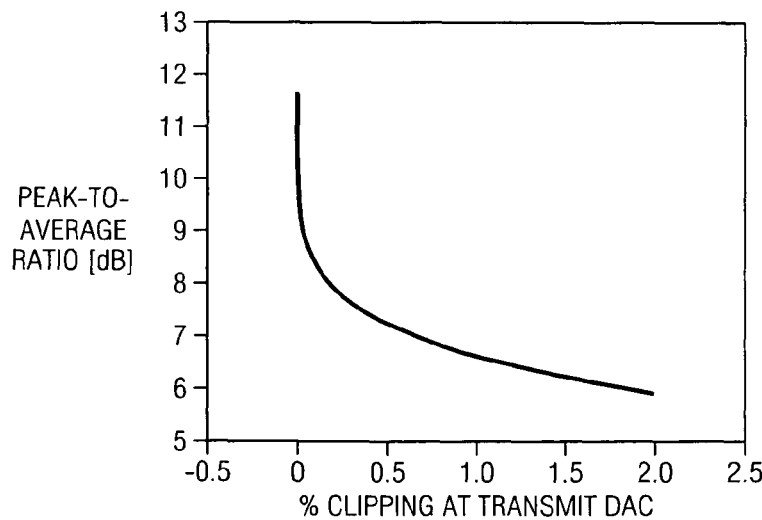
FIG. 37 is a plot illustrating peak-to-average ratio as a function of clipping percentage at the transmit DAC according to one embodiment.

The peak-to-average ratio (PAR) requirement of an OFDM system is a critical parameter in assessing whether the system can be implemented in CMOS. A very large PAR requirement would dictate a higher peak transmit power and higher bit precision for the transmit DAC. However, for an OFDM system the PAR can be decreased by allowing a very small percentage of clipping at the transmit DAC. The tradeoff 370 between PAR and clipping percentage at the transmit DAC is illustrated in FIG. 37 for an OFDM system with 128 tones. The impact of clipping at the transmit DAC on system performance was investigated for the TFI-OFDM system. For a PAR of 9 dB the clipping percentage at the transmit DAC is negligibly small and the performance degradation is less than 0.1 dB for an AWGN as well as a multi-path (CM3: 4-10 m NLOS) channel environment. For the TFI-OFDM system, the average transmit power in each sub-band (including the pilot tones) is −9.5 dBm. A PAR of 9 dB results in a peak transmit power of less than 0 dBm, which is realizable in CMOS technology.

FFT/IFFT Complexity

The FFT/IFFT is one of the digital base-band modules in an OFDM system that could potentially be of high complexity. The present inventors show below that the FFT/IFFT block for the TFI-OFDM system has only moderate complexity and can be implemented with current digital technology. In the TFI-OFDM system, during RX/TX mode, a 128-point FFT/IFFT operation has to be performed within a symbol duration of $T_{SYMB}$=312.5 ns. Using a radix-2 architecture for the FFT/IFFT implementation requires that 320 complex multiplies and 896 complex additions be performed every 312.5 ns. Table 26 below lists the number of complex multiplies/additions operations per clock cycle as a function of the clock frequency. For the sake of comparison, performing 10 complex multiplies at a clock frequency of 102.4 MHz is equivalent to implementing a 2-finger rake receiver operating at a rate of 512 MHz.

TABLE 26

Number of multiply/addition operations for a 128-point FFT/IFFT

| Clock Frequency (MHz) | Number of complex multiplies/cycle | Number of complex additions/cycle |
|---|---|---|
| 51.2 | 20 | 56 |
| 64 | 16 | 44.8 |
| 102.4 | 10 | 28 |
| 128 | 8 | 22.4 |

Figure 38:
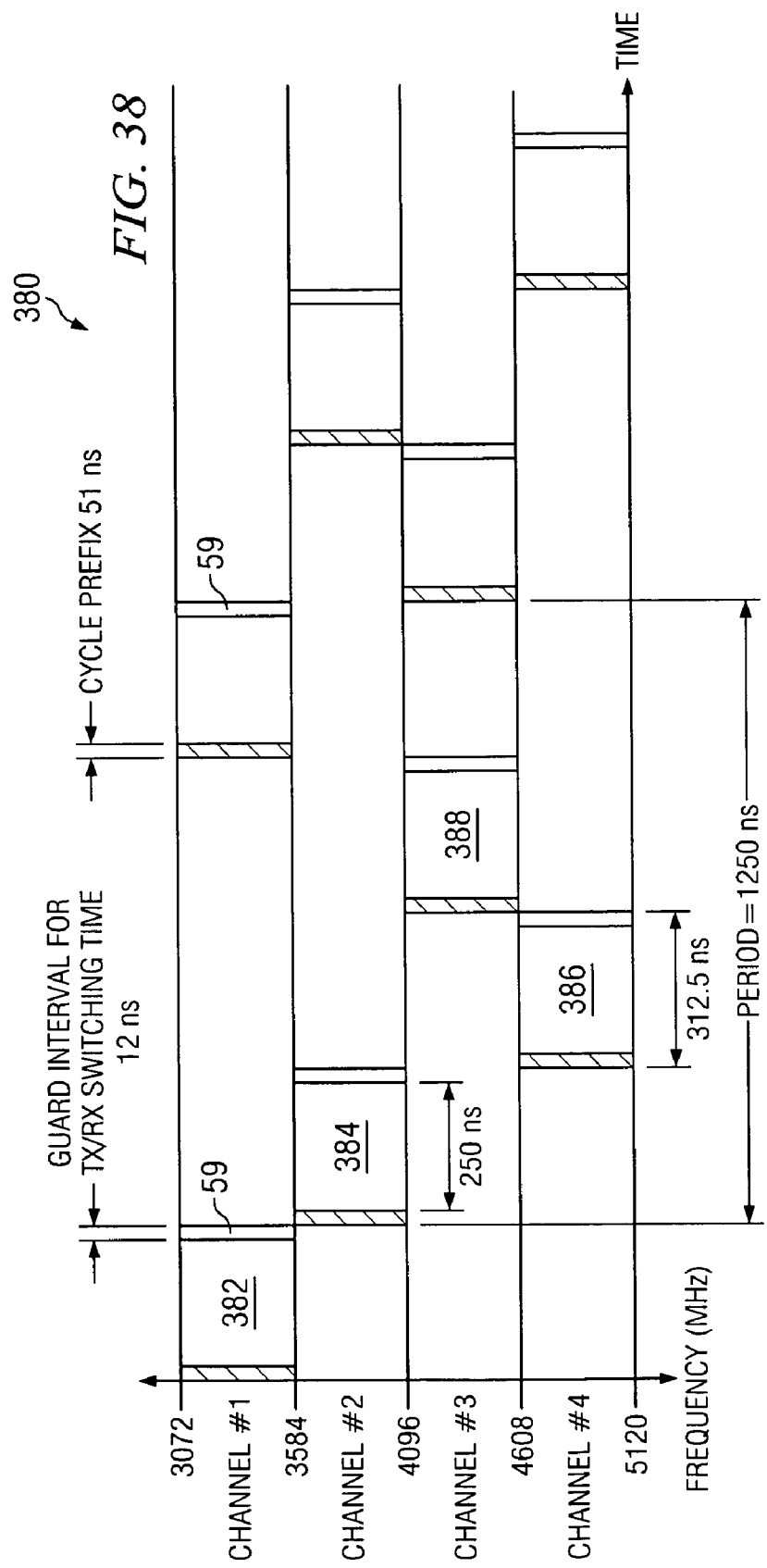
FIG. 38 illustrates a time-frequency interleaved OFDM according to another embodiment.

Keeping the above descriptions in mind, a UWB system employing time-frequency interleaved OFDM (TFI-OFDM) is now described in detail. In this system, the OFDM symbols are interleaved across both time and frequency. An example of this interleaving 380 is shown in FIG. 38. In this example, the first OFDM symbol 382 is transmitted on channel #1, the second OFDM symbol 384 is transmitted on channel #2, the third OFDM symbol 386 is transmitted on channel #4, the fourth OFDM symbol 388 is transmitted on channel #3, and so on. So in this example, the interleaving done is across four OFDM symbols. The exact interleaving pattern may be different from packet to packet and piconet to piconet. From this figure, we also see that a guard interval is inserted after each OFDM symbol. This guard interval 59 ensures the transmitter and receiver have sufficient time to switch from the current channel to the next channel as stated herein before.

An advantage of dividing the band into smaller sub-bands is that it decreases the bandwidth requirements for the variable gain amplifier (VGA) and the rate at which the analog-to-digital converter (ADC) operates. An advantage of interleaving the OFDM symbols is that one can exploit the transmit duty cycle of each channel to increase the total transmit power on that channel. In addition, one can exploit the frequency diversity of the channel by interleaving the symbols across the different bands as also stated herein before. By inserting a guard interval 59 between the interleaved OFDM symbols, one can ensure that only one transmit and one receive chain are necessary in each UWB device. In contrast, a minimum of two receive chains are needed in order to capture the multipath energy in an impulse-based sub-band system.

By using an OFDM modulation scheme instead of a single-carrier modulation scheme, one can guarantee worldwide regulatory compliance. By dynamically turning tones and/or channels on or off, one can generate arbitrary shapes for the transmit power spectral density. Another advantage of using OFDM is that it also allows one to deal with narrow-band interferers more intelligently. For example, a strong narrow-band interferer will affect at most a few tones within an OFDM symbol. If this interferer can be detected, the corrupted tones can be erased, and if there are not too many erasures, the forward error correction code can recover the lost information. Therefore, one can still transmit data on this channel as long one can reliably detect the interferer. In contrast, a strong narrow-band interference will result in the loss of the information from an entire channel in an impulse-based sub-band system. Since information cannot be reliably transmitted on this channel because of the strong interferer, impulse-based sub-band systems will have to stop transmitting information on this entire channel in order to avoid the interferer. Therefore, the impulse-based sub band systems could potentially lose valuable spectrum (500 MHz wide channel) due to a very narrow-band interferer.

Another advantage of using an OFDM modulation scheme is that it does not require the phase to remain constant for a channel over time. It is possible that random phase offsets may be introduced when the system switches from one channel to the next. In other words, OFDM is robust to random phase offsets present in the system. In contrast, these random phase offsets can potentially results in serious performance degradations for the impulse-based sub-band systems.

Another advantage of using an OFDM modulation scheme is that one can minimize self-generated adjacent channel interference (self-generated ACI). In heavy multipath environments, the energy from the tail end of the OFDM symbol will be spread in time and will overlap also in time with the beginning of the next OFDM symbol. If there were no gap between the information-bearing portions of the OFDM symbols, then this energy would result in adjacent channel interference. Because there is a guard interval after the tail end of the OFDM symbol and there is a cyclic prefix before the beginning of the next OFDM symbol, the multipath energy due to the tail end of the OFDM symbol should decay significantly before the information portion of the next OFDM symbol thereby, minimizing the effects of self-generated ACI. On the other hand, in impulse-based sub-band systems, the self-generated ACI can be quite large, because the gaps between symbols are not long enough to allow sufficient decay in the multipath energy. This self-generated ACI can potentially lead to performance degradations in the impulse-based sub-band systems.

A transmitter and receiver architecture for a TFI-OFDM UWB system are described herein below, keeping the foregoing limitations in mind.

Transmitter Architecture

Figure 39:
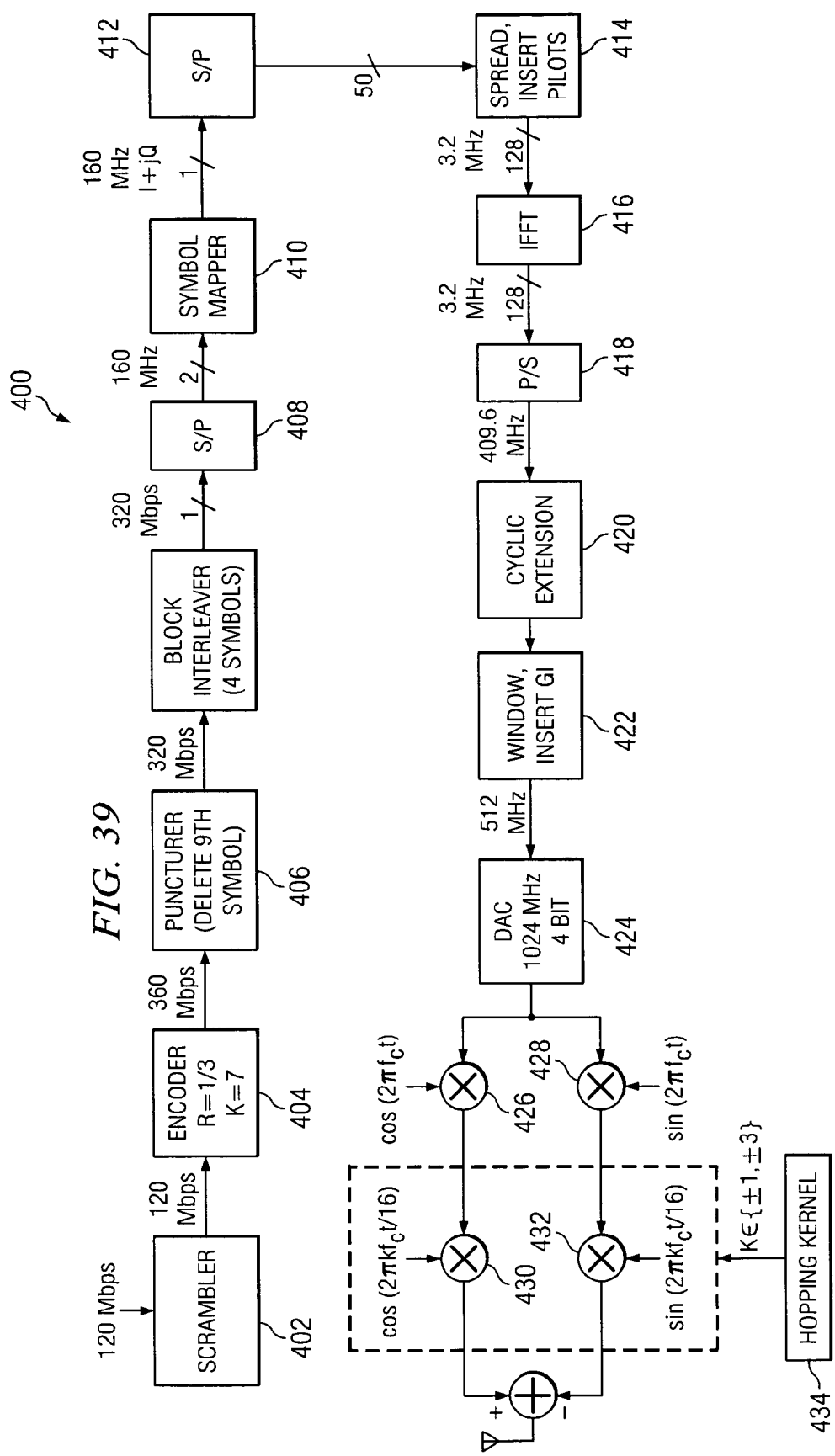
FIG. 39 is a block diagram illustrating a transmitter architecture for a TFI-OFDM system according to one embodiment.

A transmitter architecture and system parameters for a UWB system employing time-frequency interleaved OFDM is now described herein below. A block diagram of one such transmitter architecture 400 is shown in FIG. 39. For a base information rate of 120 Mbps, the information bits are first whitened using a scrambler 402 and then encoded 404 using a rate R=1/3, constraint length K=7 convolutional code to generate a coded bit rate of 360 Mbps. The output of the convolutional coder 404 is then passed through a puncturer 406, which deletes every $9^{th}$ coded symbol, to decrease the effective rate of the coded bit sequence to 320 Mbps. By puncturing the coded data stream in this manner, the coding rate has been effectively reduced to 3/8. A serial-to-parallel converter 408 takes these outputs and groups two of the coded bits together and passes them through a symbol mapper 410, which maps two bits onto a QPSK constellation. The outputs of the symbol mapper 410 are grouped together by a serial-to-parallel converter 412 to create a 50×1 complex data vector. This vector represents the frequency-domain information that is to be transmitted. A spreader 414 is used to introduce redundancy into the data vector and to create a 100×1 complex data vector. After the redundancy has been introduced, pilot tones and dummy data tones are inserted into the data vector to create a 128×1 complex data vector. The resulting data vector is then passed through an IFFT 416 to create a complex time-domain data vector. The output of the IFFT is converted back into a serial data stream via a parallel-to-serial converter 418. To create an OFDM symbol, a cyclic prefix is pre-appended 420 to the data stream, and a guard interval is appended 422 to the data stream. The cyclic prefix, which is composed of the last 26 symbols of the IFFT output, is used to mitigate the effects of multipath, while the guard interval, which effectively corresponds to 6 zero symbols, is inserted to allow sufficient time for the transmitter and receiver to switch to the next channel. The resulting OFDM symbol is then passed through a windowing function to help shape the power spectral density of the transmitted signal. Next, the output of the windowing function is sent to a digital-to-analog converter (DAC) 424 running at 1024 MHz with a precision of 4 bits. The resulting analog signal is then up-converted using a two-mixer approach. The first set of mixers 426, 428 (both I and Q) moves the signal to a carrier frequency $f_c$=4096 MHz. The second set of mixers 430 432 (both I and Q) shifts the signal to the proper channel location. In this architecture, we have assumed a total of 4 channels, each with a bandwidth 512 MHz. Note that it is possible to extend the number of channels to as high as 15. The center frequency for channel n, $f_0(n)$, is given by the following relationship:

$$f_0(n) = f_c\left(\frac{2n-5}{16}\right), \text{ where } n \in \{1, 2, 3, 4\}.$$

An interleaving kernel 434 is used to specify the exact interleaving pattern for the OFDM symbols. This kernel produces an interleaving index k=(2n−5) either via a table lookup of pre-stored hopping sequences or via a linear feedback shift register (LFSR). In this system, the interleaving kernel produces an output for each OFDM symbol and this value remains constant over the entire OFDM symbol.

Table 27 below summarizes some of the key parameters for the transmitter architecture. This table includes not only the systems parameters for the base information rate of 120 Mbps, but also for some of the lower (fall-back) and higher data rates that may be needed in an actual UWB device.

does not include any processing gain that may be introduced elsewhere in the system. This cyclic prefix length provides a reasonable tradeoff between overhead and losses due to multipath energy collection and inter-carrier interference.

Guard Interval

By selecting the spacing between channels to be integer multiples of f/16, it possible to generate the frequency for the second stage of mixers 430, 432 by simply passing the carrier frequency through a series of dividers. An advantage of using dividers is that it is now possible to obtain switching times of less than 11.7 ns. Therefore, as also stated herein before, a guard interval of 11.7 ns should be sufficient to allow both the transmitter and receiver to switch between the different channels.

Receiver Architecture

One embodiment of a receiver architecture for a UWB system employing TFI-OFDM is now described herein below with reference to FIG. 40, that shows a block diagram of the a receiver architecture 500. The receiver 500 can be seen to consist of a front-end pre-select filter 502 (off-chip filter) followed by a low-noise amplifier (LNA) 504. The output of the LNA 504 is then mixed down by a pair of mixers 506, 508 (in-phase and quadrature), which are operating at a carrier frequency of $f_c$=4096 MHz.

After the first stage of mixers 506, 508, a second bank of mixers 510 is used to mix the desired channel down to DC. The interleaving kernel 512 specifies the desired channel location. The outputs of these mixers 510 are summed 514,

TABLE 27

Summary of the transmitter parameters for a TFI-OFDM system.

| | Info. Data Rate | | | | |
|---|---|---|---|---|---|
| | 48 Mbps | 80 Mbps | 120 Mbps | 200 Mbps | 480 Mbps |
| Modulation | OFDM | OFDM | OFDM | OFDM | OFDM |
| FFT Size | 128 | 128 | 128 | 128 | 128 |
| Convolutional Code | R = 1/3, K = 7 | R = 1/3, K = 7 | R = 1/3, K = 7 | R = 1/3, K = 7 | R = 1/3, K = 7 |
| Puncturing Pattern | Every 9 symbols: Delete $9^{th}$ entry | Every 15 symbols: Delete $3^{rd}, 4^{th}, 6^*, 9^{th}, 11^*, 12^{th}, 15^{th}$ entry | Every 9 symbols: Delete $9^{th}$ entry | Every 15 symbols: Delete $3^{rd}, 4^{th}, 6^{th}, 9^{th}, 11^{th}, 12^{th}, 15^{th}$ entry | Every 9 symbols: Delete $2^{nd}, 3^{rd}, 6^{th}, 7^{th}, 9^{th}$ entry |
| Effective. Coding Rate | $\hat{} = 3/8$ | $Re_{ff} = 5/8$ | $R_{eff} = 3/8$ | $R_{Seff} = 5/8$ | R,ff = 3/4 |
| Spreading Factor | 5 | 5 | 2 | 2 | 1 |
| Information Tones | 20 | 20 | 50 | 50 | 100 |
| Data Tones | 100 | 100 | 100 | 100 | 100 |
| Pilot Tones | 8 | 8 | 8 | 8 | 8 |
| Constellation | QPSK | QPSK | QPSK | QPSK | QPSK |
| Information Length | 250 ns | 250 ns | 250 ns | 250 ns | 250 ns |
| Cyclic Prefix Length | 50.8 ns | 50.8 ns | 50.8 ns | 50.8 ns | 50.8 ns |
| Guard Interval | 11.7 ns | 11.7 ns | 11.7 ns | 11.7 ns | 11.7 ns |
| Symbol Length | 312.5 ns | 312.5 ns | 312.5 ns | 312.5 ns | 312.5 ns |
| Channel Bit Rate | 640 Mbps | 640 Mbps | 640 Mbps | 640 Mbps | 640 Mbps |
| Frequency | 3.1-5.1 GHz | 3.1-5.1 GHz | 3.1-5.1 GHz | 3.1-5.1 GHz | 3.1-5.1 GHz |
| Multipath Tolerance | 50.8 ns | 50.8 ns | 50.8 ns | 50.8 ns | 50.8 ns |

Cyclic Prefix Length

The impact of the cyclic prefix length on the system performance is now described herein below with reference again to FIG. 36. Looking again at FIG. 36, a plot illustrates the average captured energy for the CMS channel environment as well as the inter-carrier interference (ICI) introduced by the multipath energy outside the cyclic prefix window. For a cyclic prefix length of 51 ns, the average loss in collected multipath is less than 0.5 dB, and the inter-carrier interference is less than −15 dB. As stated herein before, this ICI value

Figure 40:
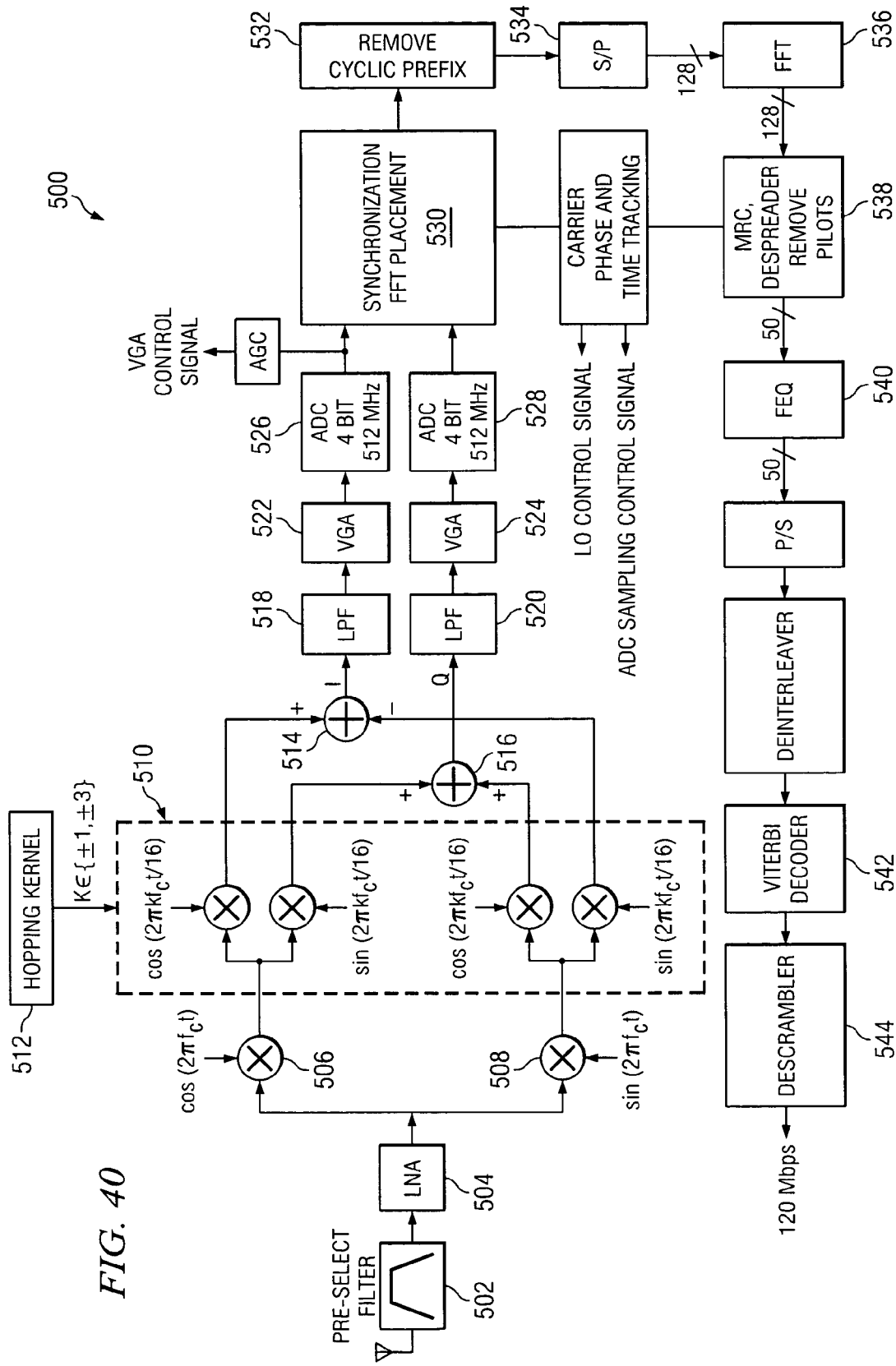
FIG. 40 is a block diagram illustrating a receiver architecture for a system employing a filtered Gaussian pulse.

516 according to the block diagram shown in FIG. 40 to create the in-phase and quadrature analog streams for the remainder of the receiver chain. Each of the in-phase and quadrature streams is then passed through a low-pass filter 518, 520, which is a $3^{rd}$-order Butterworth filter with a 3-dB cut-off frequency $f_c$=216 MHz, to reject any images or adjacent channel interference.

The output of the low-pass filter 518, 520 is first passed through a variable gain amplifier (VGA) 522, 524 to amplify the signal and then sampled by an analog-to-digital converter (ADC) 526, 528 running at 512 MHz with 4 bits of resolution. The resulting digital data stream is first passed through a block that optimizes the FFT placement (synchronization) 530 and removes the cyclic prefix 532. Next, the serial data stream is converted to a parallel data stream (128×1 vector) via a serial-to-parallel converter 534. The time-domain output vector is then passed through an FFT 536 to generate a frequency-domain data vector. The output of the FFT block 536 is passed through a maximum ratio combiner and a de-spreader 538, which coherently combines the spread data. This block 538 also removes the pilot tones from the data vector.

A frequency-domain equalizer (FEQ) 540 is then used to compensate for the effects of the channel. Finally, the output of the FEQ 540 is converted back into a serial data stream and passed through a Viterbi decoder 542 and a de-scrambler 544.

Local Oscillator Generation for Second Stage of Mixers

For channels 2 and 3, the in-phase and quadrature local oscillators can be generated by dividing the reference clock $f_c$=4096 GHz by a factor of sixteen. For channels 1 and 4, the in-phase and quadrature local oscillators can be generated by mixing the local oscillators for channels 2 and 3 with a signal generated by dividing the reference clock $f_c$=4096 GHz by a factor of eight.

Figure 41:
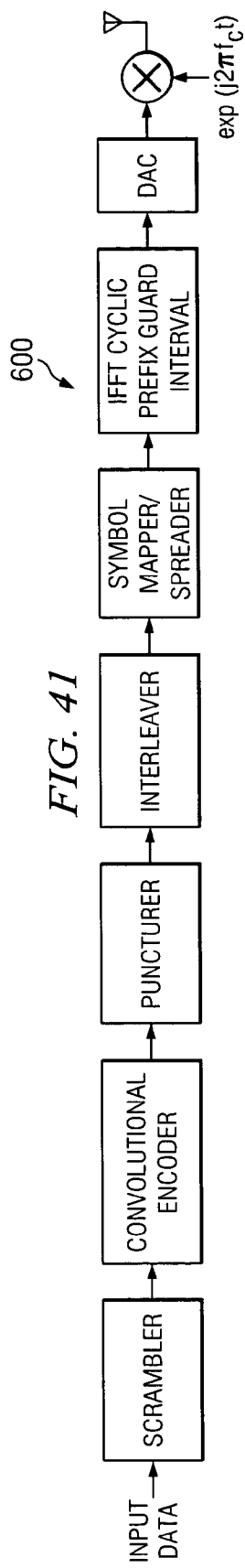
FIG. 41 is a block diagram illustrating a transmitter architecture for a multi-carrier OFDM system.

One example of a UWB system employing multi-carrier OFDM (MC-OFDM) is now described herein below with reference to FIGS. 41-44. The transmit architecture 600, (similar to that described herein before with reference to FIG. 6), for a multi-carrier OFDM system is shown in FIG. 41. Multi-carrier OFDM is similar to that of conventional OFDM except that only a subset of the tones are used for a single OFDM symbol. Between consecutive OFDM symbols, different subsets of tones are used. This is equivalent to coding the data in both time and frequency. By varying the subset of tones as a function of time (or OFDM symbol), one can lower the speed of the DAC (and correspondingly the ADC at the receiver). One can exploit the frequency diversity of the channel, to obtain the same transmit power as a full-band signal (that occupies the complete bandwidth spanned by the IFFT) such as described herein before.

Figure 42:
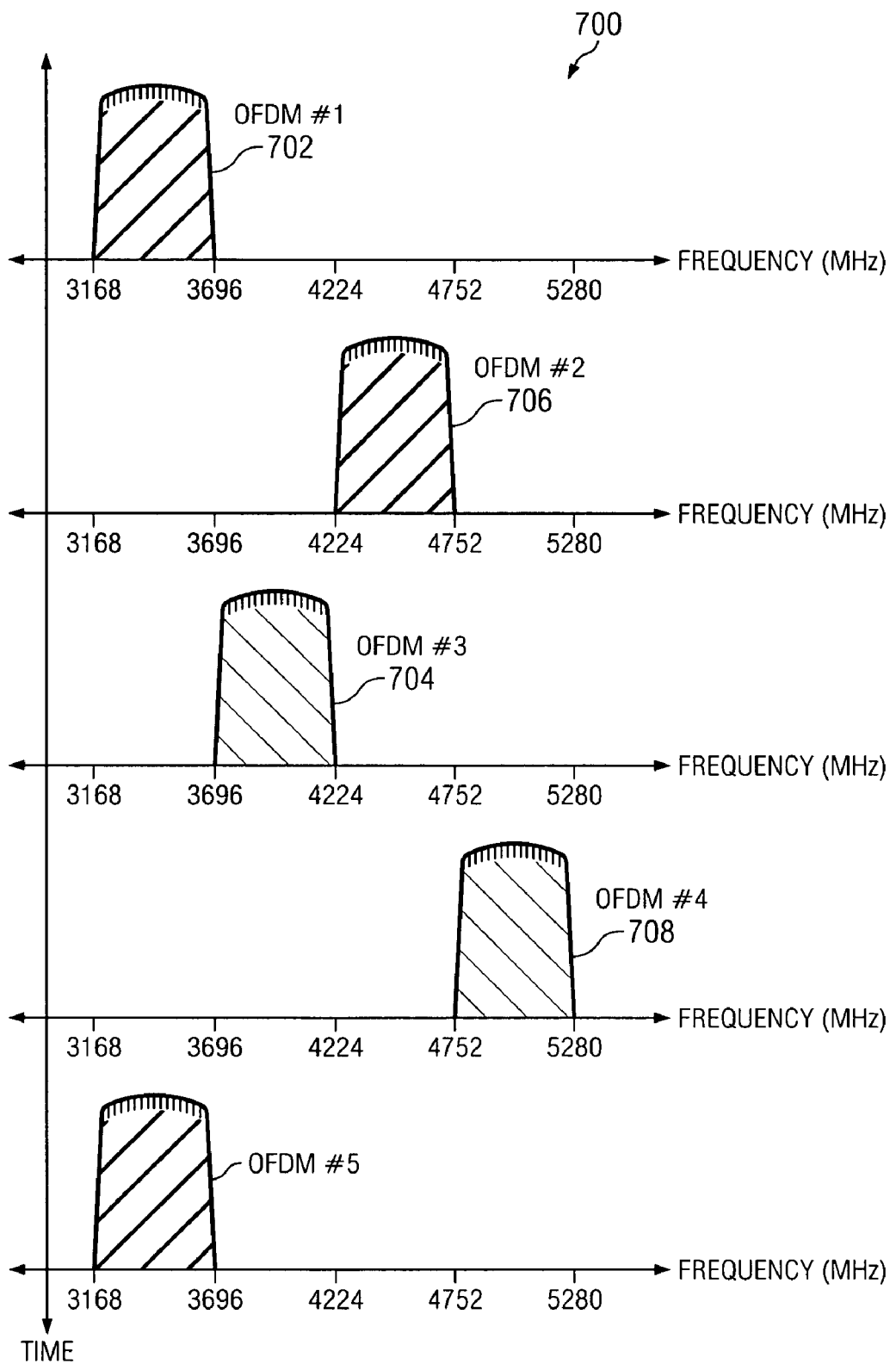
FIG. 42 illustrates a frequency-domain representation of the time-frequency coding for a multi-carrier OFDM transmission according to another embodiment.

Another example of the time-frequency coding 700 is shown in the frequency domain in FIG. 42. In this example, it has been assumed that a 512-point IFFT with a tone spacing of 4.125 MHz is used to generate a signal that spans the bandwidth from 3168 MHz to 5280 MHz. Since the minimum bandwidth requirement for a UWB signal is 500 MHz, one does not need to transmit on all tones to be a compliant UWB system. In fact, as already stated herein before, one only need to transmit on 122 tones to generate a signal that has a bandwidth greater than 500 MHz. To simplify the implementation, the present inventors have restricted attention to subsets of tones that are a power of two.

In this example, data is transmitted in the first OFDM symbol 702 on the first 128 tones (tones 1 through 128). For the second OFDM symbol 704, data is transmitted on tones 257 through 384 (third set of tones). For the third OFDM symbol 706, the data is transmitted on tones 129 through 256 (second set of tones). For the fourth OFDM symbol 708, the data is transmitted on tones 385 through 512 (fourth set of tones), and so forth. The period for this time-frequency coding pattern is four. Note that this example is just one pattern for the time-frequency coding. The pattern could vary from superframe to superframe and the period could also be longer.

Figure 43:
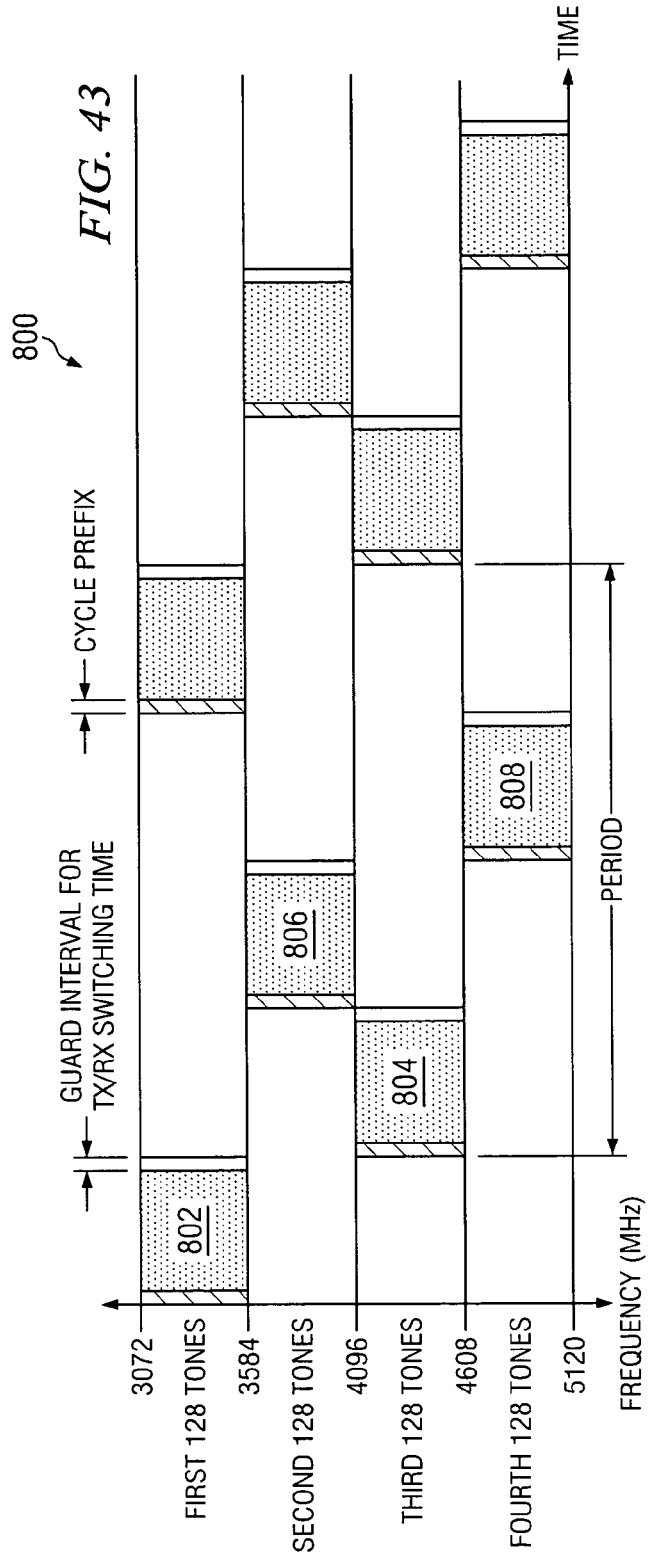
FIG. 43 illustrates a time-domain representation of the time-frequency coding for a multi-carrier OFDM transmission according to another embodiment.

An alternative view 800 of the time-frequency coding in the time-domain is shown in FIG. 43. In this example, the first OFDM symbol 802 is transmitted using the first set of 128 tones, the second OFDM symbol 804 is transmitted using the third set of 128 tones, the third OFDM symbol 806 is transmitted using the second set of 128 tones, the fourth OFDM symbol 808 is transmitted using the fourth set of 128 tones, and so on. So in this example, the time-frequency interleaving is across four OFDM symbols.

In this figure, a guard interval 59 can be seen between OFDM symbols. This guard interval is not necessary for the MC-OFDM scheme. If the guard interval 59 is inserted, then it is easy to show equivalence between the transmitted waveform from a MC-OFDM system and a time-frequency interleaved OFDM (TFI-OFDM) system. This guard interval 59 is needed in a TFI-OFDM system to ensure that the transmitter and receiver have sufficient time to switch from the current channel to the next channel.

However, for the MC-OFDM system, it is not necessary to constrain the time-frequency coding pattern to sets of disjoint tones, i.e., non-overlapping sets. For instance, consider the case where the 512 tones are partitioned in to eight overlapping sets, namely $S_0$ to $S_7$, of 128 tones each. In this partition, the set $S_i$ consists of tones indexed from (64*i+1 to mod ((64*i+128), 512)}, where mod refers to the modulo arithmetic operation. Here, any consecutive set $S_i$, and $S_{i+1}$, will have an overlap of exactly 64 tones. The time-frequency coding pattern is now defined over these eight sets of tones, $S_0$ to $S_7$. The number of possible time-frequency coding patterns that can be obtained by not constraining the sets to be non-overlapping is increased. This makes it easier to randomize the data transmission on a specific OFDM tone as a function of time and the interference from simultaneously operating uncoordinated pico-nets, which share the same spectrum, can be randomized more effectively. Hence, this specific partition technique improves the multiple pico-net capability of the MC-OFDM system in addition to lowering the requirement on the DAC and ADC rates. Note that for the TFI-OFDM system, the time-frequency coding must be done over non-overlapping sets of tones.

Receiver Architecture

Figure 44:
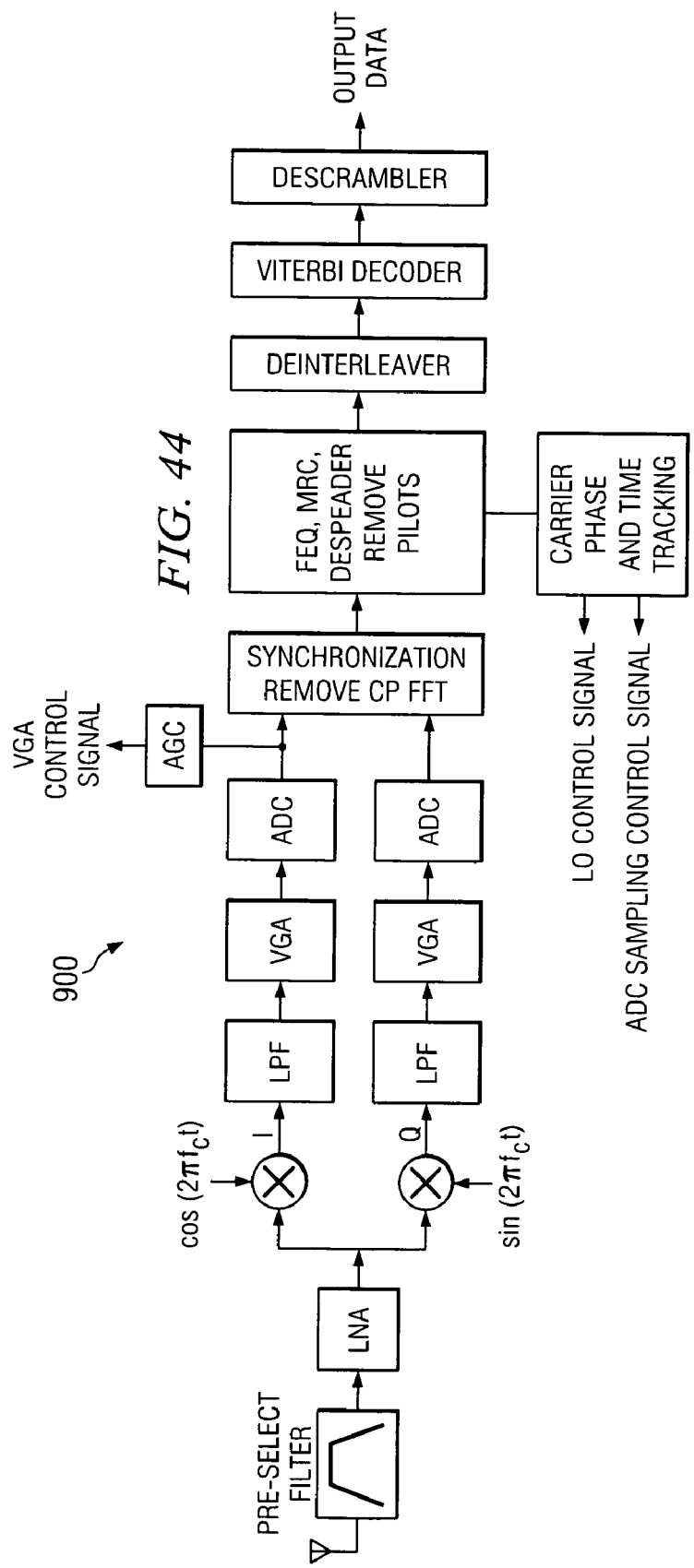
FIG. 44 is a block diagram illustrating a receiver architecture for a multi-carrier OFDM system according to one embodiment.

A receiver architecture for a multi-carrier OFDM system according to one embodiment is now described herein below with reference to FIG. 44 that is a block diagram of the receiver architecture 900. The multi-carrier OFDM receiver 900 is similar to that of a conventional OFDM receiver except that only a subset of the tones is processed in order to recover the data. Using the previous example, only 128 tones would be processed during any single OFDM symbol. By reducing the number of tones, one can effectively reduce the complexity of the FFT, FEQ, channel estimation, and phase estimation algorithms.

If a guard interval is introduced between MC-OFDM symbols, then the received signal can also be processed using the TFI-OFDM receiver architecture described herein before.

In view of the above, it can be seen the present invention presents a significant advancement in the art of wireless personal area networks. Further, this invention has been described in considerable detail in order to provide those skilled in the UWB physical layer art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A transmitter producing an ultra-wide-band (UWB) physical layer using time-frequency interleaved (TFI) orthogonal frequency division multiplexing (OFDM) within the 3.1-10.6 GHz UWB band, the UWB physical layer comprising:
   a band of frequencies divided into contiguous bands of tones;
   a plurality of OFDM symbols, each OFDM symbol having a plurality of tones from a respective contiguous band; and
   a data payload of the plurality of OFDM symbols for communication between the transmitter and a receiver, wherein consecutive OFDM symbols use different subsets of tones.

2. The UWB physical layer according to claim 1, wherein the UWB physical layer further employs TFI-OFDM, to provide a wireless personal area network (PAN) having data payload communication capabilities of up to 480 Mb/s.

3. The UWB physical layer according to claim 1, wherein the UWB physical layer is configured to operate as a full-band system.

4. The UWB physical layer according to claim 3, wherein the UWB physical layer is further configured to generate a single OFDM symbol solely from a contiguous subset of tones.

5. The UWB physical layer according to claim 4, wherein the UWB physical layer is further configured to generate a signal having a bandwidth greater than 500 MHz in response to 122 data tones.

6. The UWB physical layer according to claim 4, wherein the UWB physical layer is further configured to generate a single OFDM symbol solely from a contiguous subset of tones, wherein each subset contains 128 consecutive tones.

7. The UWB physical layer according to claim 1, wherein the UWB physical layer is further configured to vary each subset of tones as a function of time such that the UWB physical layer achieves the same transmit power as a full-band signal that occupies the complete bandwidth spanned by an inverse fast fourier transform.

8. The UWB physical layer according to claim 1, wherein the UWB physical layer is configured to operate as a sub-band system.

9. The UWB physical layer according to claim 8, wherein each OFDM symbol comprises an output of an inverse fast Fourier transform (IFFT) and one of a cyclic prefix and a cyclic postfix.

10. The UWB physical layer according to claim 9, wherein the UWB physical layer is further configured to insert a guard interval immediately following each OFDM symbol.

11. The UWB physical layer according to claim 1, wherein the plurality of OFDM symbols are interleaved across a plurality of consecutive sub-bands.

12. The UWB physical layer according to claim 11, wherein the plurality of consecutive sub-bands is 3 and wherein the pattern of time-frequency interleaving across the consecutive sub-bands is [1 3 2 1 3 2 . . . ].

13. The UWB physical layer according to claim 11, wherein each sub-band comprises a respective center frequency.

14. The UWB physical layer according to claim 1, wherein the plurality of OFDM symbols are transmitted according to a power spectral density (PSD) mask having 0 dB relative to a maximum PSD of the signal at an offset of 260 MHz from a respective center frequency, −12 dB relative to the maximum PSD of the signal at an offset of 285 MHz, and −20 dB relative to the maximum PSD of the signal at an offset of 330 MHz.

15. An ultra-wide-band (UWB) physical layer comprising a UWB transmitter generating time-frequency interleaved (TFI) orthogonal frequency division multiplexed (OFDM) signals within the 3.1-10.6 GHz UWB band, each signal comprising:
   a band of frequencies divided into contiguous bands of tones;
   a plurality of OFDM symbols generated by an inverse fast Fourier transform (IFFT) of frequency domain data, each OFDM symbol having a plurality of tones from a respective contiguous band;
   a data payload of the plurality of OFDM symbols for communication between the transmitter and a receiver, wherein consecutive OFDM symbols use different subsets of tones;
   one of a cyclic prefix and a cyclic postfix with to the data payload; and
   a guard interval between the time domain data and said one of a cyclic prefix and a cyclic postfix comprising a plurality of zero samples.

16. The UWB physical layer according to claim 15, wherein the UWB transmitter further generates a guard interval immediately following each OFDM symbol, and wherein the guard interval has a time period sufficient to allow the UWB transmitter to switch from one channel to another.

17. The UWB physical layer according to claim 15, further comprising a UWB receiver configured to receive TFI-OFDM signals, wherein the UWB transmitter and the UWB receiver together form a personal area network (PAN).

18. A UWB physical layer as in claim 15, wherein the frequency domain data is generated in the frequency domain.

19. A UWB physical layer as in claim 15, wherein the frequency domain data is generated from time domain data by a discrete Fourier transform (DFT).

20. A UWB physical layer as in claim 15, wherein the bandwidth of the OFDM signals is at least 500 MHz.

21. A UWB physical layer as in claim 15, wherein the IFFT produces the time domain data from 128 contiguous tones.

22. A UWB physical layer as in claim 15, wherein the frequency domain data comprises encoded information bits and pad bits.

23. A UWB physical layer as in claim 22, wherein the information bits and pad bits are encoded using a R=1/3, K=7 convolutional code.

24. A UWB physical layer as in claim 22, wherein the encoded information bits and pad bits are punctured to generate various coding rates from R=11/32 to R=3/4.

25. A UWB physical layer as in claim 23, wherein the encoded bits are interleaved, mapped onto symbols, and then onto tones.

26. A UWB physical layer as in claim 25, wherein tones include pilot tones that are randomized according to a cover sequence.

27. A modulation scheme for ultra-wideband (UWB) systems, the scheme comprising the method steps of:
   providing a band of frequencies divided into contiguous bands of tones;
   providing a UWB physical layer operational to generate orthogonal frequency division multiplexed (OFDM) symbols within a desired band, each OFDM symbol having a plurality of tones from a respective contiguous band, and wherein consecutive OFDM symbols use different subsets of tones;

interleaving by the UWB transmitter the OFDM symbols across both time and frequency to divide the desired band into smaller sub-bands; and inserting a guard interval comprising plural zero samples after each OFDM symbol, such that the UWB physical layer has sufficient time to switch from its current channel to the next channel.

28. The modulation scheme according to claim 27, wherein the desired band comprises the 3.1-10.6 GHz UWB band.

29. The modulation scheme according to claim 27, wherein the physical layer is further operational to support a wireless personal area network (PAN) having data payload communication capabilities of 55, 80, 110, 160, 200, 320 and 480 Mb/s.

30. The modulation scheme according to claim 27, wherein the UWB physical layer is further operational to generate a single OFDM symbol solely from a contiguous subset of tones.

31. The modulation scheme according to claim 27, wherein the UWB physical layer is further operational to employ different subset of tones between consecutive OFDM symbols.

32. The modulation scheme according to claim 31, wherein the UWB physical layer is further operational to vary the subset of tones as a function of time such that the UWB physical layer achieves the same transmit power as a full-band signal that occupies the complete bandwidth spanned by an inverse fast fourier transform.

33. The modulation scheme according to claim 27, wherein the UWB physical layer is further operational to generate a signal having a bandwidth greater than 500 MHz in response to 122 data tones.

34. The modulation scheme according to claim 27, wherein the UWB physical layer is further configured to generate a single OFDM symbol solely from a contiguous subset of tones, wherein each subset contains 128 consecutive tones.

* * * * *